United States Patent
Bognar

(10) Patent No.: US 11,707,714 B1
(45) Date of Patent: Jul. 25, 2023

(54) REACTIVE BYPRODUCT TREATMENT IN GAS GENERATORS

(71) Applicant: Anasphere, Inc., Manhattan, MT (US)

(72) Inventor: John A. Bognar, Belgrade, MT (US)

(73) Assignee: Anasphere, Inc., Manhattan, MT (US)

( * ) Notice: Subject to any disclaimer, the term of this patent is extended or adjusted under 35 U.S.C. 154(b) by 0 days.

(21) Appl. No.: 17/738,838

(22) Filed: May 6, 2022

Related U.S. Application Data

(60) Provisional application No. 63/321,846, filed on Mar. 21, 2022, provisional application No. 63/184,890, filed on May 6, 2021.

(51) Int. Cl.
  *B01D 53/76* (2006.01)
  *B64B 1/58* (2006.01)

(52) U.S. Cl.
  CPC .......... *B01D 53/76* (2013.01); *B64B 1/58* (2013.01); *B01D 2251/30* (2013.01); *B01D 2258/02* (2013.01); *B01D 2259/122* (2013.01)

(58) Field of Classification Search
  CPC ............ B01D 53/76; B01D 2259/122; B01D 2258/02; B01D 2251/30; B01D 53/74; B64B 1/58; B64B 1/40; B64B 1/62; C01B 3/02; C01B 3/04; C01B 3/065
  See application file for complete search history.

(56) References Cited

U.S. PATENT DOCUMENTS

| | | | |
|---|---|---|---|
| 906,009 A | | 12/1908 | Goldschmidt |
| 3,977,990 A | * | 8/1976 | Beckert ............. C01B 3/04 516/11 |
| 10,220,930 B2 | | 3/2019 | Bognar |
| 10,532,800 B2 | | 1/2020 | Bognar |
| 2020/0231265 A1 | | 7/2020 | Bognar |

FOREIGN PATENT DOCUMENTS

| EP | 3 901 086 A1 * | 10/2021 | ............ C01B 3/00 |
|---|---|---|---|
| GB | 2 164 637 A * | 3/1986 | ............ C01B 3/02 |

OTHER PUBLICATIONS

U.S. Appl. No. 17/738,862, filed May 6, 2022, Bognar.

* cited by examiner

*Primary Examiner* — Timothy C Vanoy
(74) *Attorney, Agent, or Firm* — Sheridan Ross P.C.

(57) ABSTRACT

The disclosure provides devices, methods, and systems for treating reactive metals and other reactive species produced during operation of thermal solid-state gas generators. Thermal energy, which may be derived from the gas generation process, physical contact with the evolved gases, or a dedicated or shared heat source, is used to release a gaseous species that neutralizes the reactive species. In some embodiments, the neutralization reaction causes the release of additional product gas(es).

47 Claims, 10 Drawing Sheets

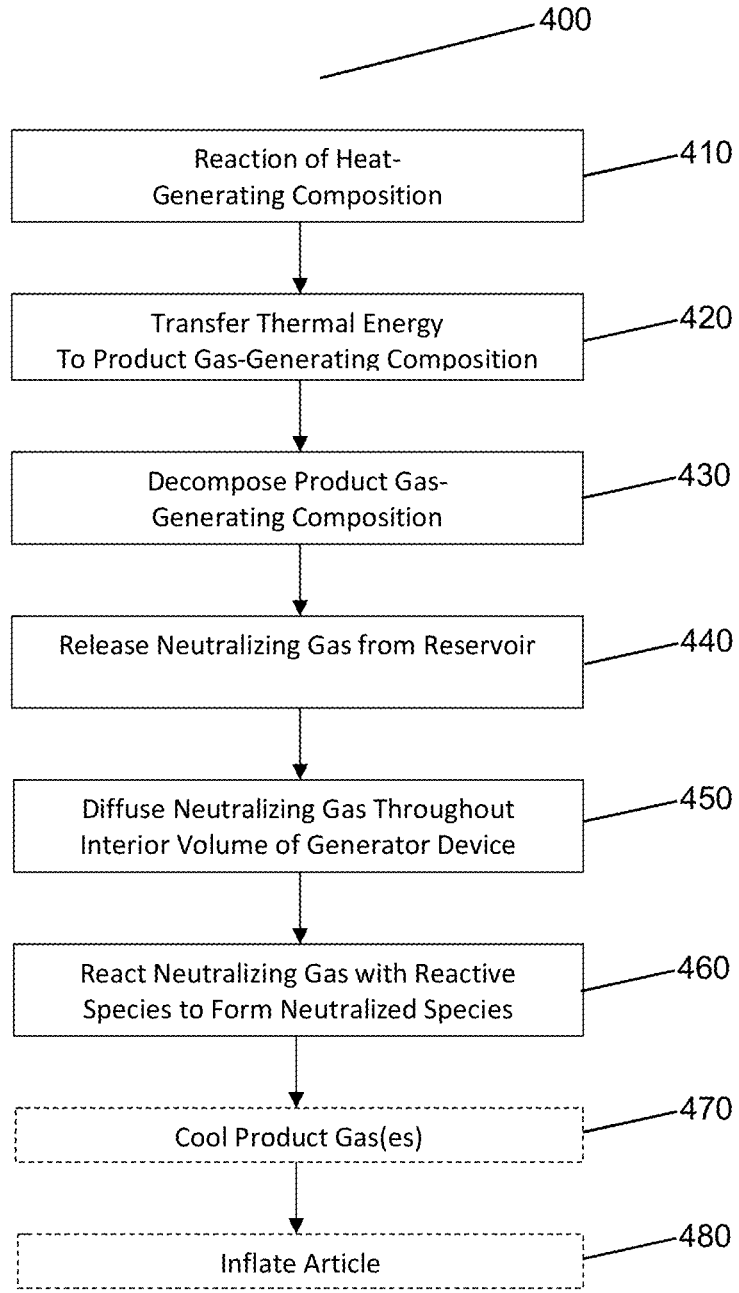

US 11,707,714 B1

REACTIVE BYPRODUCT TREATMENT IN GAS GENERATORS

CROSS-REFERENCE TO RELATED APPLICATIONS

This application claims the benefit of priority under 35 U.S.C. § 119(e) of U.S. Provisional Patent Application 63/184,890, filed 6 May 2021, and 63/321,846, filed 21 Mar. 2022, the entireties of both of which are incorporated herein by reference.

FIELD

This disclosure relates generally to thermal gas generators, and particularly to devices, methods, and systems for neutralizing reactive metals or other reactive species formed as undesirable byproducts in gas generators.

BACKGROUND

Current thermal gas generators, such as those described in U.S. Pat. No. 10,220,930, use a heat-generating material to release gas from a gas storage or gas production material, e.g., use a thermite to release hydrogen gas from a metal hydride. While these generators are useful in a wide variety of applications, they suffer from certain drawbacks that impair their suitability for certain use cases.

One of the most significant of these drawbacks is that the thermal gas generator produces reactive byproduct species, which may include metals (e.g., elemental sodium) and/or other reactive species (e.g., metal hydrides such as lithium hydride). These species can react violently with oxygen gas and/or water vapor and thus present significant dangers of ignition or explosion when the generator or an inflatable device associated therewith is opened after the gas generation reaction has been completed.

SUMMARY

In an aspect of the present disclosure, a gas generator device comprises a heat-generating composition, configured to undergo a reaction that releases heat when ignited; a product gas-generating composition, configured to thermally decompose to release a product gas and a reactive species upon receiving at least a portion of the heat released by reaction of the heat-generating composition; and a neutralizing gas-generating composition, wherein the gas generator device is configured to heat the neutralizing gas-generating composition and thereby cause the neutralizing gas-generating composition to undergo a phase change or thermal decomposition to release a neutralizing gas, and wherein the gas generator device is further configured to cause at least a portion of the reactive species and at least a portion of the neutralizing gas to contact and chemically react with each other to form a less reactive species.

In embodiments, the gas generator device may further comprise a first compartment, containing the heat-generating composition; a second compartment, containing the product gas-generating composition; and a first separator, positioned between and separating the first and second compartments, and the gas generator device may be configured such that, when the reaction of the heat-generating composition is initiated by ignition of the heat-generating composition, at least a portion of the heat released by the reaction is transferred from the first compartment to the second compartment via the first separator at a first heat transfer rate. The gas generator device may, but need not, further comprise a third compartment, containing the neutralizing gas-generating composition; and a second separator, positioned between and separating the second and third compartments, and the gas generator device may, but need not, be further configured such that at least a portion of the heat transferred from the first compartment to the second compartment via the first separator is subsequently transferred from the second compartment to the third compartment via the second separator at a second heat transfer rate.

In embodiments, at least a portion of the neutralizing gas-generating composition may be disposed within an outlet path of the product gas.

In embodiments, the heat-generating composition and the product gas-generating composition may be provided in a reactive stack, the reactive stack may be disposed within an interior volume of the gas generator device, and at least a portion of the neutralizing gas-generating composition may be disposed within the interior volume. The neutralizing gas-generating composition may, but need not, at least partially circumferentially surround the reactive stack within the interior volume. The neutralizing gas-generating composition may, but need not, be provided at a base of or below the reactive stack.

In embodiments, the heat-generating composition may comprise a thermite composition, the thermite composition comprising a mixture of a metal fuel and a metal oxide oxidizer that undergoes an exothermic reduction-oxidation reaction when ignited by heat.

In embodiments, the product gas-generating composition may comprise a metal hydride.

In embodiments, the product gas may be hydrogen gas.

In embodiments, the reactive species may comprise at least one of an alkali metal in elemental form and an alkali metal hydride.

In embodiments, the neutralizing gas-generating composition may comprise at least one of a hydrated metal salt, a halogen in elemental form, a metal halide, an ammonium salt, a compound containing an ammonia-bearing complex ion, or an alcohol.

In embodiments, the neutralizing gas may comprise at least one of water vapor and a halogen.

In embodiments, the gas generator device may be configured to heat the neutralizing gas-generating composition by at least one of (i) physical contact with the product gas, (ii) residual or waste heat from reaction of the heat-generating composition, (iii) residual or waste heat from thermal decomposition of the product gas-generating composition, wherein the thermal decomposition of the product gas-generating composition is exothermic, and (iv) a separate portion of heat-generating composition.

In embodiments, the gas generator device may further comprise an igniter configured to ignite the heat-generating composition.

In another aspect of the present disclosure, a method comprises (a) initiating a reaction of a heat-generating composition to release thermal energy; (b) thermally decomposing, by at least a portion of the thermal energy released in step (a), at least a portion of a product gas-generating composition to release a product gas and a reactive species; (c) heating a neutralizing gas-generating composition to release a neutralizing gas; and (d) contacting at least a portion of the reactive species with at least a portion of the neutralizing gas to cause a chemical reaction that forms a less reactive species.

In embodiments, at least a portion of the neutralizing gas-generating composition is disposed within an outlet path of the product gas.

In embodiments, the heat-generating composition and the product gas-generating composition may be provided in a reactive stack, the reactive stack may be disposed within an enclosed volume, and at least a portion of the neutralizing gas-generating composition may be disposed within the enclosed volume. The neutralizing gas-generating composition may, but need not, at least partially circumferentially surround the reactive stack within the enclosed volume. The neutralizing gas-generating composition may, but need not, be provided at a base of or below the reactive stack.

In embodiments, the heat-generating composition may comprise a thermite composition, the thermite composition comprising a mixture of a metal fuel and a metal oxide oxidizer that undergoes an exothermic reduction-oxidation reaction when ignited by heat.

In embodiments, the product gas-generating composition may comprise a metal hydride.

In embodiments, the product gas may be hydrogen gas.

In embodiments, the reactive species may comprise at least one of an alkali metal in elemental form and an alkali metal hydride.

In embodiments, the neutralizing gas-generating composition may comprise at least one of a hydrated metal salt, a halogen in elemental form, a metal halide, an ammonium salt, or a compound containing an ammonia-bearing complex ion, or an alcohol.

In embodiments, the neutralizing gas may comprise at least one of water vapor and a halogen.

In embodiments, step (c) may be carried out by at least one of (i) physical contact with the product gas, (ii) residual or waste heat from reaction of the heat-generating composition, (iii) residual or waste heat from thermal decomposition of the product gas-generating composition, wherein the thermal decomposition of the product gas-generating composition is exothermic, and (iv) a separate portion of heat-generating composition.

In another aspect of the present disclosure, an inflatable device comprises an inflatable article; and a gas generator device as disclosed herein, interconnected to and configured to inflate the inflatable article with the product gas.

In another aspect of the present disclosure, a gas generator device comprises a heat-generating composition, configured to undergo a reaction that releases heat when ignited; a product gas-generating composition, configured to thermally decompose to release a product gas and a reactive species upon receiving at least a portion of the heat released by reaction of the heat-generating composition; and a neutralizing gas-generating composition contained in a sealed environment, wherein the gas generator device is configured to cause the sealed environment to open to cause the release of a neutralizing gas, and wherein the gas generator device is further configured to cause at least a portion of the reactive species and at least a portion of the neutralizing gas to contact and chemically react with each other to form a less reactive species.

In embodiments, the gas generator device may further comprise a first compartment, containing the heat-generating composition; a second compartment, containing the product gas-generating composition; and a first separator, positioned between and separating the first and second compartments, and the gas generator device may be configured such that, when the reaction of the heat-generating composition is initiated by ignition of the heat-generating composition, at least a portion of the heat released by the reaction is transferred from the first compartment to the second compartment via the first separator at a first heat transfer rate.

In embodiments, the sealed environment may comprise a sealed packet surrounding the neutralizing gas-generating composition and the opening of the sealed environment may comprise melting or thermal degradation of a material of the sealed packet.

In embodiments, the heat-generating composition may comprise a thermite composition, the thermite composition comprising a mixture of a metal fuel and a metal oxide oxidizer that undergoes an exothermic reduction-oxidation reaction when ignited by heat.

In embodiments, the product gas-generating composition may comprise a metal hydride.

In embodiments, the product gas may be hydrogen gas.

In embodiments, the reactive species may comprise at least one of an alkali metal in elemental form and an alkali metal hydride.

In embodiments, the neutralizing gas may comprise at least one of water vapor and a halogen.

In another aspect of the present disclosure, the gas generator device may further comprise an igniter configured to ignite the heat-generating composition.

In another aspect of the present disclosure, a method comprises (a) initiating a reaction of a heat-generating composition to release thermal energy; (b) thermally decomposing, by at least a portion of the thermal energy released in step (a), at least a portion of a product gas-generating composition to release a product gas and a reactive species; (c) causing a sealed reservoir containing a neutralizing gas to open to release the neutralizing gas; and (d) contacting at least a portion of the reactive species with at least a portion of the neutralizing gas to cause a chemical reaction that forms a less reactive species.

In embodiments, the heat-generating composition and the product gas-generating composition may be provided in a reactive stack, the reactive stack may be disposed within an enclosed volume, and at least a portion of the sealed reservoir may be disposed within the enclosed volume. The sealed reservoir may, but need not, at least partially circumferentially surround the reactive stack within the enclosed volume. The sealed reservoir may, but need not, be provided at a base of or below the reactive stack.

In embodiments, the heat-generating composition may comprise a thermite composition, the thermite composition comprising a mixture of a metal fuel and a metal oxide oxidizer that undergoes an exothermic reduction-oxidation reaction when ignited by heat.

In embodiments, the product gas-generating composition may comprise a metal hydride.

In embodiments, the product gas may be hydrogen gas.

In embodiments, the reactive species may comprise at least one of an alkali metal in elemental form and an alkali metal hydride.

In embodiments, the neutralizing gas may comprise at least one of iodine, bromine, an alcohol, and water.

In another aspect of the present disclosure, an inflatable device comprises an inflatable article; and a gas generator device as disclosed herein, interconnected to and configured to inflate the inflatable article with the product gas.

The devices and methods of the present disclosure can have several advantages. One possible advantage of the devices and methods of the present disclosure is that they can generate large quantities of thermal energy, and therefore large quantities of the desired gas or mixture of gases, per unit mass of gas generator. Thus, the devices provided herein can be substantially more compact than conventional devices for generating gases and may therefore allow for the provision of one or more product gases in applications where the significant volume of conventional gas storage solutions (e.g., pressurized cylinders) cannot be accommodated. Additionally, because the heat-generating composition undergoes a reaction that preferably produces little or no offgas—or, in other words, because most of the heat generated by the heat-generating composition is retained in the solid or liquid reaction products—a greater fraction of the thermal energy produced is available to decompose the metal hydride or other gas generating substance.

Another possible advantage of the devices and methods of the present disclosure is that they avoid the safety hazards posed by some conventional devices and methods for providing a desired gas. Particularly, pressurized vessels, e.g., gas cylinders, pose various dangers, particularly in challenging environments such as airborne and space environments. In the practice of the present disclosure, none of the reactants (i.e., the heat-generating composition), the gas starting material, or the decomposition product (i.e., the product gas) need ever be pressurized, unless required by the application and then only to that minimal degree, thereby avoiding the dangers posed by pressurized gas storage vessels.

Another possible advantage of the devices and methods of the present disclosure is that the starting materials are resistant to phase change and other unwanted physical and chemical changes prior to reaction of the heat-generating composition. By way of non-limiting example, liquid or gas starting materials may be susceptible to undesirable or even dangerous condensation or freezing when employed in low-temperature environments, e.g., the upper atmosphere and space. By remaining in the solid state and generally nonreactive until ignited, the heat- and product gas-generating compositions used in embodiments of the present disclosure avoid this concern and eliminate the need for costly and/or mass- or volume-intensive liquid or gas storage and handling equipment; in terms of simplicity, long-term storage stability, and cost, storage of solid-state materials is generally far more feasible for many applications than dewars or similar devices for storing liquefied gases.

Another possible advantage of the devices and methods of the present disclosure is that the heat-generating composition may be ignited, and thus the decomposition of the metal hydride or other gas generating substance into the gas(es) of interest initiated, by any of several simple and easy methods. Such methods include, but are not limited to, heat, spark, flame, friction, and other pyrotechnic initiation mechanisms.

Another possible advantage of the devices and methods of the present disclosure is that the chemical makeup of the heat-generating composition may be selected or tuned to provide for a desired reaction rate, reaction temperature, amount of thermal energy produced, etc. In some embodiments, decomposition of the gas generating substance, e.g. metal hydride(s), may produce two or more product gases in a proportion that is at least partially temperature-dependent, and/or it may be desirable to further heat the product gases to trigger a secondary decomposition reaction; by way of non-limiting example, it may be desirable, in some applications, to cause at least some of an intermediate gas to be secondarily decomposed to hydrogen gas. As an additional non-limiting example, a higher reaction temperature of the heat-generating composition will in turn increase the amount of thermal energy available to decompose the metal hydride, which in embodiments may cause the metal hydride to decompose more rapidly and thus limit the formation of undesirable byproducts, impurities, or offgases. In this way, by selecting an appropriate chemical makeup of the heat-generating composition, it is possible for those skilled in the art to control or tune the amount, composition, formation rate, etc. of the product gas(es).

Another possible advantage of the devices and methods of the present disclosure is that they can produce product gases without the use of a catalyst. Specifically, the very high temperatures generated by the heat-generating compositions, e.g., thermite compositions, of the present disclosure can facilitate "brute force" thermal decomposition without the need for a catalyst, and the paths by which the metal hydride decomposes at such temperatures can thermodynamically favor the end product gas(es) rather than any intermediate byproducts or impurities. Of course, it may in some embodiments be desirable to include a catalyst and/or to generate a mixture of two or more product gases; such embodiments are expressly contemplated and within the scope of the present disclosure.

As used herein, unless otherwise specified, the term "compartment" refers to an area, a layer, a region, or a volume of a gas generator device adjacent to one face, side, or surface of a separator of the gas generator device. A "compartment" of a gas generator device, as that term is used herein, generally has, or is adapted to have, disposed therein a gas-generating composition (e.g., a metal hydride) or a heat-generating composition (e.g., a thermite mixture). In some embodiments, the gas-generating composition or heat-generating composition may occupy less than the entirety of a compartment (for example, a headspace or air gap may surround the gas-generating composition or heat-generating composition within the compartment), while in other embodiments the gas-generating composition or heat-generating composition may occupy the entirety, or substantially the entirety, of the compartment (for example, the compartment may be a volume lying between one surface of a separator and a sidewall of the gas generator device, and the gas-generating composition or heat-generating composition may fill, or substantially fill, such volume). It is to be expressly understood that two "compartments" of a gas generator device, as that term is used herein, may, but need not, be completely isolated or sealed from one another; in some embodiments, there may be one or more gaps, passages, spaces, or voids (e.g., about a circumferential edge of the separator) that allow gases or other materials to pass from one compartment, adjacent to a first face, side, or surface of a separator, to another compartment, adjacent to a second face, side, or surface of the separator.

As used herein, unless otherwise specified, the term "thermite" refers to a mixture of a metal fuel and a metal oxide oxidizer. The metal oxide may, but need not, be selected from the group consisting essentially of vanadium (V) oxide, iron(III) oxide, iron(II,III) oxide, copper(II) oxide, copper(I) oxide, tin(IV) oxide, titanium dioxide, manganese dioxide, manganese(III) oxide, chromium(III) oxide, cobalt(II) oxide, silicon dioxide, nickel(II) oxide, silver oxide, molybdenum trioxide, lead(II,IV) oxide, bismuth(III) oxide, and combinations thereof, and the metal may, but need not, be selected from the group consisting of aluminum, magnesium, silicon, manganese, an alloy of magnesium and aluminum, and combinations thereof. The thermite composition may, but need not, comprise more than one metal, more than one metal oxide, or both. When ignited by heat, thermite undergoes an exothermic reduction-oxidation (redox) reaction.

As used herein, unless otherwise specified, the term "neutralizing gas" (also referred to herein as "gaseous neutralizing species") refers to a chemical species that is employed in this invention to react with another species, and is found in the gas phase, or exhibits a useful vapor pressure, under the immediate environmental conditions (temperature and pressure) in its immediate vicinity upon its initial production, release, or evolution. It may be released, by way of non-limiting example, as a result of a thermally-driven or thermally-initiated process such as thermal decomposition, chemical reaction, or sublimation. It may also be released by simple virtue of vapor pressure above either itself or a substance that produces it. It is understood that it may not remain in the gas phase under all conditions found within the gas generator and associated systems including inflatable articles, but may later become liquid or solid as its immediate environmental conditions (temperature and pressure) change. It may or may not maintain its chemical function in the system as its physical state changes.

As used herein, unless otherwise specified, the term "neutralizing gas-generating composition" refers to a substance or mixture that can release a neutralizing gas. This may be a compound which decomposes to release the gas, a mixture that reacts to produce the gas, or a solid or liquid form of the neutralizing gas itself.

While specific embodiments and applications have been illustrated and described, the present disclosure is not limited to the precise configuration and components described herein. Various modifications, changes, and variations which will be apparent to those skilled in the art may be made in the arrangement, operation, and details of the methods and systems disclosed herein without departing from the spirit and scope of the overall disclosure.

As used herein, unless otherwise specified, the terms "about," "approximately," etc., when used in relation to numerical limitations or ranges, mean that the recited limitation or range may vary by up to 10%. By way of non-limiting example, "about 750" can mean as little as 675 or as much as 825, or any value therebetween. When used in relation to ratios or relationships between two or more numerical limitations or ranges, the terms "about," "approximately," etc. mean that each of the limitations or ranges may vary by up to 10%; by way of non-limiting example, a statement that two quantities are "approximately equal" can mean that a ratio between the two quantities is as little as 0.9:1.1 or as much as 1.1:0.9 (or any value therebetween), and a statement that a four-way ratio is "about 5:3:1:1" can mean that the first number in the ratio can be any value of at least 4.5 and no more than 5.5, the second number in the ratio can be any value of at least 2.7 and no more than 3.3, and so on.

The embodiments and configurations described herein are neither complete nor exhaustive. As will be appreciated, other embodiments are possible utilizing, alone or in combination, one or more of the features set forth above or described in detail below.

BRIEF DESCRIPTION OF THE DRAWINGS

FIG. 10 depicts a process according to some embodiments of the present disclosure.

DETAILED DESCRIPTION

Figure 1:
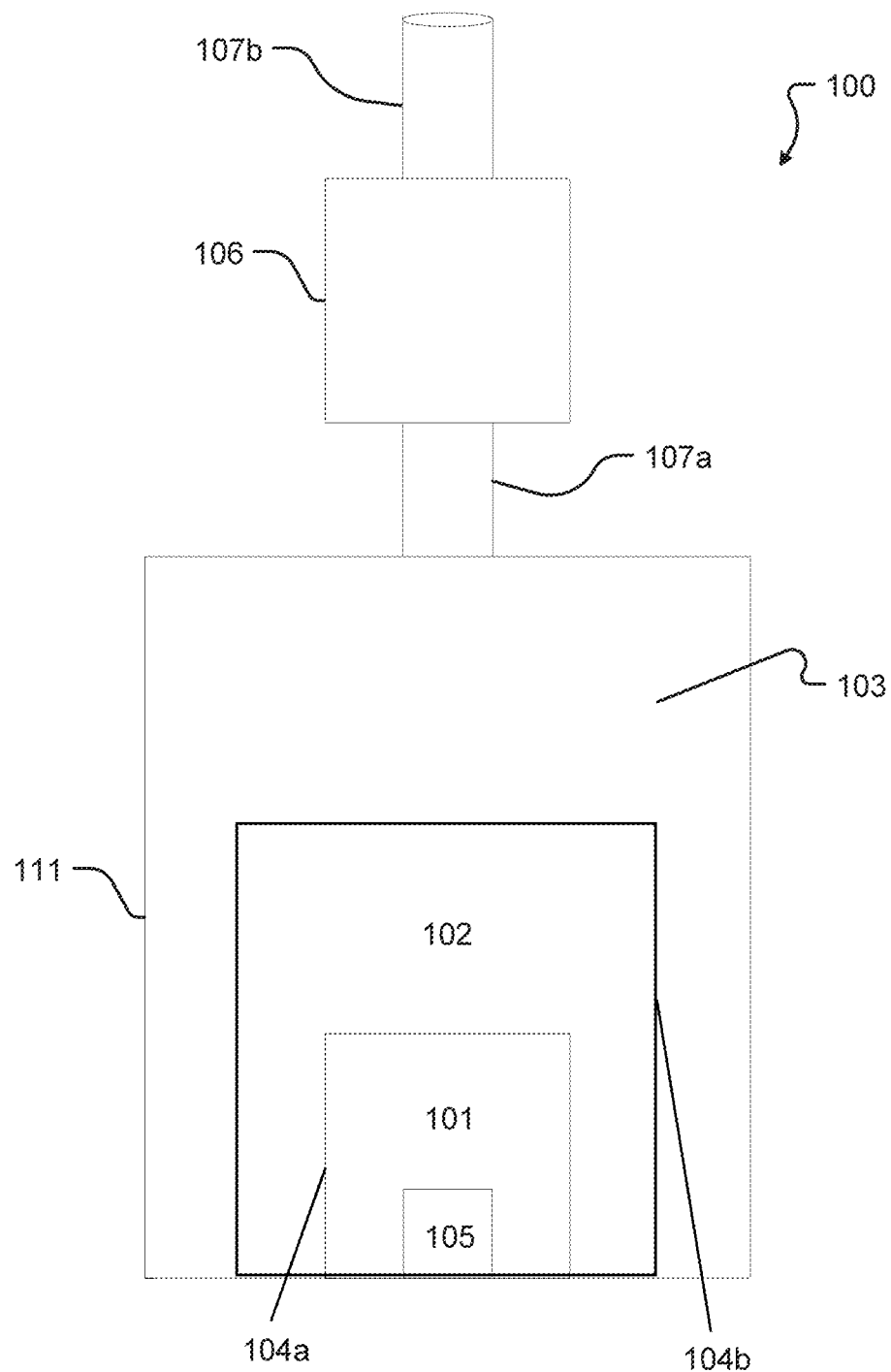
FIG. 1 depicts a device according to some embodiments of the present disclosure.

Unless defined otherwise, all technical and scientific terms used herein have the same meaning as is commonly understood by one of ordinary skill in the art. All patents, applications, published applications, and other publications to which reference is made herein are incorporated by reference in their entirety. If there is a plurality of definitions for a term herein, the definition provided in the Summary prevails unless otherwise stated.

For purposes of further disclosure and to comply with applicable written description and enablement requirements, the following references generally relate to systems and methods for gas generation and are hereby incorporated by reference in their entireties:

U.S. Pat. No. 10,220,930, entitled "Thermal hydrogen generator using a metal hydride and thermite," issued 5 Mar. 2019 to Bognar ("the '930 patent").

U.S. Pat. No. 10,532,800, entitled "Thermal hydrogen generator using a metal hydride and thermite," issued 14 Jan. 2020 to Bognar ("the '800 patent").

U.S. patent application Ser. No. 16/741,508, entitled "Thermal hydrogen generator using a metal hydride and thermite," filed 13 Jan. 2020 by Bognar ("the '508 application").

U.S. patent application Ser. No. 17/738,862, entitled "Sequential gas generation arrangement for thermal gas generators," filed 6 May 2022 by Bognar ("the '862 application").

The present disclosure provides thermal gas generator devices containing a heat-generating composition (e.g., thermite) and at least two gas-generating compositions, namely a product gas-generating composition (e.g., a metal hydride) and a neutralizing gas-generating composition (e.g., a hydrated salt). The devices utilize a reaction of the heat-generating composition to create thermal energy that in turn causes the thermal decomposition of at least a portion of the product-gas generating composition into at least one product gas (e.g., hydrogen gas) and at least one reactive species (e.g, alkali metals, alkali metal hydrides, etc.). The neutralizing gas-generating composition is a chemical or mixture of chemicals that, when heated, either becomes or releases a gaseous species that can react with the reactive species produced by decomposition of the product gas-generating composition. The generator device is configured to allow the gaseous neutralizing species (which may be interchangeably referred to throughout this disclosure as the "neutralizing gas"), once formed or released, to mix throughout any volume in which the reactive species may be located, such as, by way of non-limiting example, an internal volume of the generator, a volume or vessel with which the generator is in fluid communication and that is configured to receive the product gas, and/or transfer lines and exit paths therebetween. Upon contacting the reactive species, the gaseous neutralizing species reacts with the reactive species to form a less reactive and/or less dangerous species (which may be interchangeably referred to throughout this disclosure as a "neutralized species"), thereby reducing or eliminating the hazards of the reactive species (e.g., by mitigating the risk of ignition or explosion of the reactive species when the generator device is opened and exposed to air) without further intervention by an operator or user of the gas generator device. The need for special precautions in handling the spent gas generator device (or a vessel or volume receiving the product gas(es) therefrom, e.g., an inflatable device configured to be inflated by the gas generator device) may thereby be reduced.

In some embodiments, the less reactive and/or less dangerous species may exist in the form of a passivating coating on the surface of particles or droplets of the reactive species, thereby encapsulating the reactive species in a safe form without requiring the substantial entirety of the reactive species to be neutralized in order to render the system safe. This embodiment leads to the more efficient use of a limited (less than stoichiometric) amount of neutralizing species.

In some embodiments, the neutralizing gas may be introduced without additional heating of a neutralizing gas-generating material, by simply causing a reservoir of that neutralizing material (e.g., iodine, bromine, water, or low-molecular-weight alcohols) to be unsealed such that the vapor pressure of that species above itself will cause the neutralizing species to be present in the gas phase and to diffuse throughout the gas generator and/or complete system including, for example, connecting lines and/or an inflatable article.

In some embodiments, the less reactive and/or less dangerous species may be a liquid or solid under the pressure and temperature conditions that prevail inside the generator device, in which case the species may condense or deposit as liquid or solid particles; it is to be expressly understood, however, that this is not necessarily true in all embodiments, and that the less reactive and/or less dangerous species may be in the gas phase without departing from the scope of the present disclosure. In some embodiments, the phase change or decomposition of the neutralizing gas-generating composition, and/or the reaction of the neutralizing species with the reactive species, may additionally result in or release a desired product gas (which may be the same as or different from the product gas formed by reaction of the product gas-generating composition); again, however, this will not be the case in all embodiments.

Figure 6:
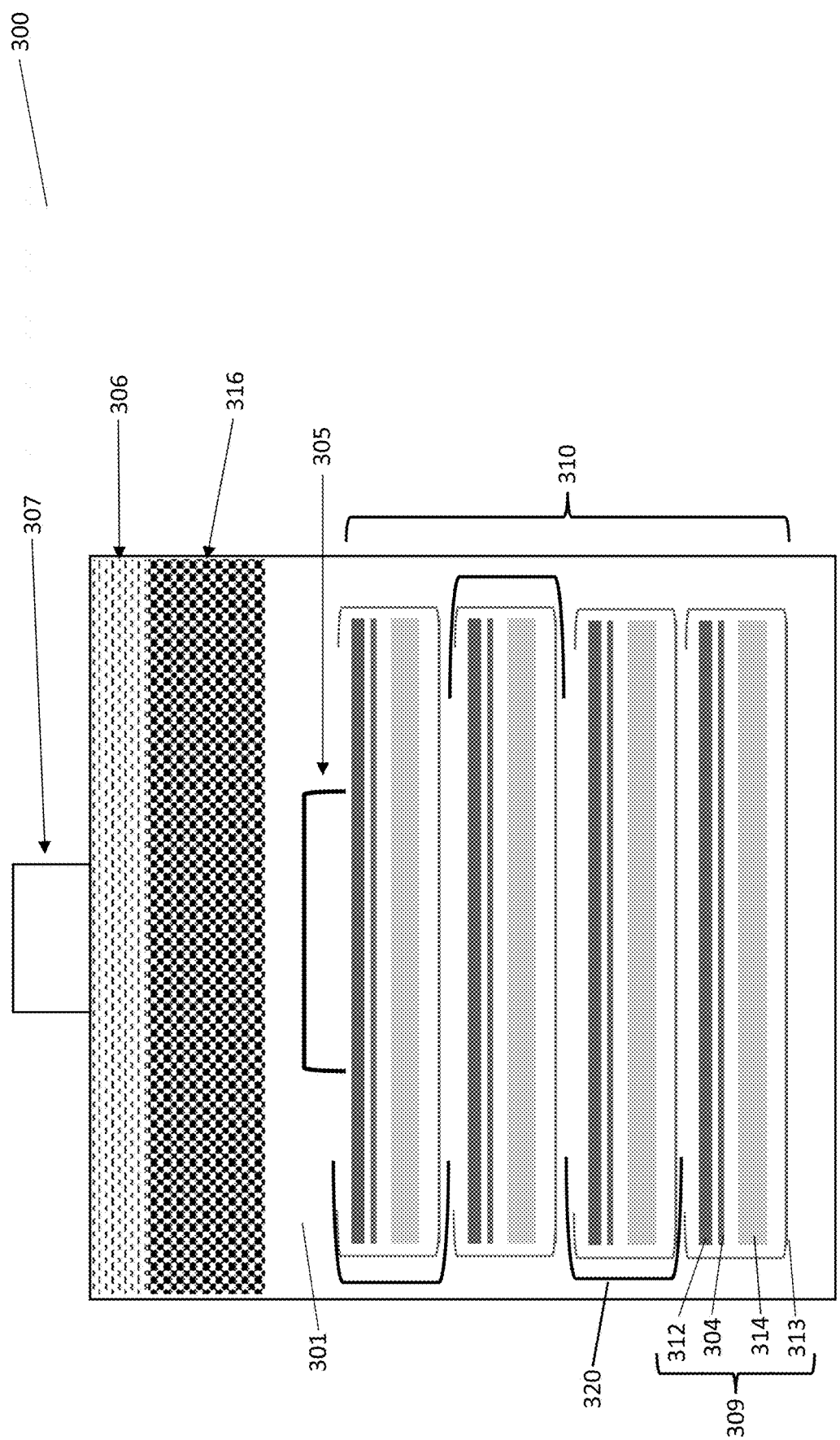
FIG. 6 illustrates a gas generator device comprising a neutralizing gas-generating composition in-line with an outlet gas stream according to some embodiments of the present disclosure.
Figure 7:
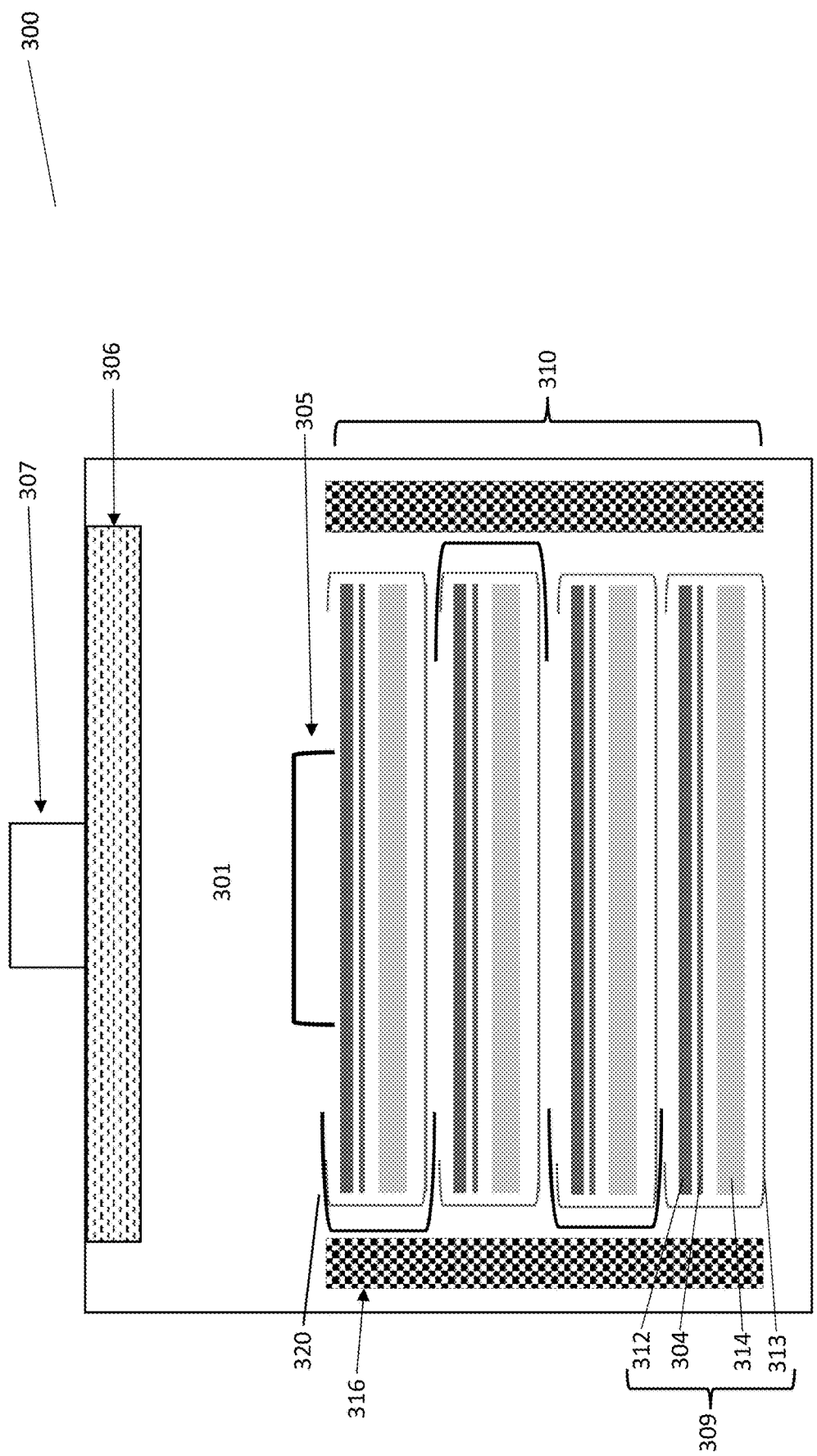
FIG. 7 illustrates a gas generator device comprising a reactive stack and a neutralizing gas-generating composition provided in the form of a jacket around the reactive stack according to some embodiments of the present disclosure.
Figure 8:
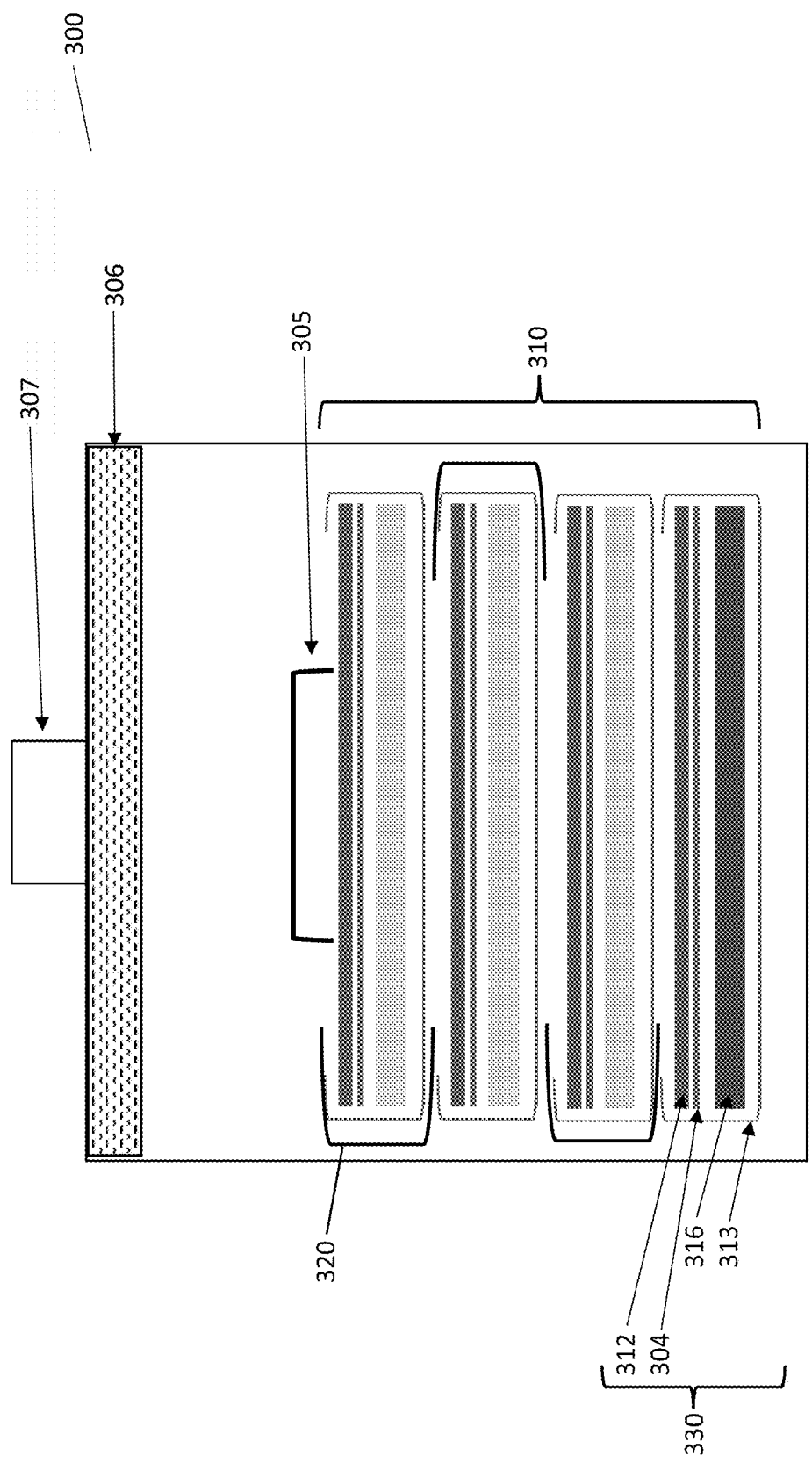
FIG. 8 illustrates a gas generator device comprising a reactive stack and a separate layer of a neutralizing gas-generating composition disposed below the reactive stack according to some embodiments of the present disclosure.

The neutralizing gas-generating composition may be provided in any one or more spaces such that (1) the neutralizing gas-generating composition will receive heat from one or more sources and (2) the gaseous neutralizing species produced by the neutralizing gas-generating composition will physically contact the reactive species generated by the product gas-generating composition. By way of first non-limiting example, at least a portion of the neutralizing gas-generating composition may be provided in an outlet or exit path of the product gas(es), as illustrated in FIG. 6; this type of embodiment may be especially advantageous in cases in which it is desired for production of the gaseous neutralizing species to begin substantially simultaneously with the beginning of production of the product gases. By way of second non-limiting example, at least a portion of the neutralizing gas-generating composition may be provided in an annular space within the gas generator device that at least partially circumferentially surrounds a reactive stack housed within the gas generator device, as illustrated in FIG. 7; this type of embodiment may be especially advantageous in cases in which it is desired for initial production of the gaseous neutralizing species to be slightly delayed relative to the beginning of production of the product gases. By way of third non-limiting example, at least a portion of the neutralizing gas-generating composition may be provided below or at a base of a reactive stack housed within the gas generator device, such that the gaseous neutralizing species is released into a volume surrounding the reactive stack, as illustrated in FIG. 8; this type of embodiment may be especially advantageous in cases in which it is desired for production of the gaseous neutralizing species to be delayed until reaction of the product gas-generating composition has slowed or substantially completed, e.g., where the gaseous neutralizing species is intended for post-reaction "cleanup" of remaining reactive species inside the gas generator device. Of course, some embodiments will feature a combination of two or all three of these configurations (e.g., to achieve varying compositions and/or production rates of the gaseous neutralizing species over the course of the operation of the gas generator device), as well as others that will be appreciated by those of ordinary skill in the art in view of this disclosure.

The heat used to evolve the gaseous neutralizing species from the neutralizing gas-generating composition may be derived from any one or more sources. By way of first non-limiting example, at least a portion of this heat may be transferred to the neutralizing gas-generating composition by physical contact with the hot product gas(es) generated by reaction of the product gas-generating composition. By way of second non-limiting example, at least a portion of this heat may be residual or waste heat from reaction of the heat-generating composition and/or reaction of the product gas-generating composition (where this reaction is exothermic). By way of third non-limiting example, at least a portion of this heat may be provided by the same ignition or initiation source used to initiate reaction of the heat-generating composition. By way of fourth non-limiting example, at least a portion of this heat may be provided by a separate, dedicated portion of heat-generating composition or a separate heating element. Of course, some embodiments will feature a combination of two, three, or all four of these configurations, as well as others that will be appreciated by those of ordinary skill in the art in view of this disclosure.

In an exemplary embodiment of a gas generator device according to the present disclosure, the desired product gas is hydrogen gas, the product gas-generating composition is sodium borohydride, and the neutralizing gas-generating composition is Epsom salt (magnesium sulfate heptahydrate, $MgSO_4 \cdot 7H_2O$). At very high temperatures, such as those generated by reactions of thermite (which in many embodiments may be used as the heat-generating composition), sodium borohydride decomposes to release not only hydrogen gas but also sodium metal in the liquid or gas phase. As the generator operates, heat generated by reaction of the heat-generating composition reaches the Epsom salt (directly, due to placement of the Epsom salt within a volume of the generator heated by the heat-generating composition, and/or indirectly, due to placement of the Epsom salt in a flow path of the hot gaseous reaction products of the sodium borohydride), resulting in the release of water vapor from the Epsom salt. This water vapor serves as the gaseous neutralizing species; upon contacting the sodium metal, the water vapor reacts according to chemical equation (1) below to form sodium hydroxide, eliminating the ignition/explosion risk presented by the sodium, and advantageously producing further hydrogen gas, the desired product gas:

$$2Na + 2H_2O(g) \rightarrow 2NaOH + H_2(g) \qquad (1)$$

Depending on the temperature at the location where the water vapor and sodium metal contact, the sodium hydroxide may be initially deposited in the gas phase and thereby be entrained in the hydrogen (product) gas stream (and may, in some embodiments, be filtered or precipitated by cooling downstream), or the sodium hydroxide may be formed in the liquid or solid phase and thereby drop out of the product gas stream by condensation or deposition.

The neutralizing gas-generating composition may include any one or more chemicals that, when heated, release a neutralizing species that is gaseous either at the time of its initial production, or during at least a portion of its residence within the gas generator device, or both. By way of first non-limiting example, the gaseous neutralizing species may be water vapor and the neutralizing gas-generating composition may include at least one hydrated salt, such as a hydrated metal halide (e.g., magnesium chloride hexahydrate, cobalt (II) chloride hexahydrate, aluminum chloride hexahydrate, iron (III) chloride hexahydrate, etc.), hydrated sulfate (e.g., magnesium sulfate heptahydrate, sodium sulfate decahydrate, iron (II) sulfate heptahydrate, copper (II) sulfate pentahydrate, etc.), hydrated phosphate (e.g., cobalt (II) phosphate octahydrate, etc.), hydrated borate (e.g., sodium tetraborate decahydrate, etc.), hydrated carbonate (e.g., sodium carbonate decahydrate, etc.), hydrated hydroxide (e.g., barium hydroxide octahydrate, etc.), or hydrated organic acid salt (e.g., sodium acetate trihydrate, magnesium acetate tetrahydrate, etc.) that releases water when heated. By way of second non-limiting example, the gaseous neutralizing species may be a halogen and the neutralizing gas-generating composition may include a solid or liquid mass of a halogen (e.g., solid iodine, liquid bromine, etc.), in which case the halogen may be heated or the vapor pressure over the halogen may be adequate to achieve the desired effects without the involvement of any heat source. By way of third non-limiting example, the gaseous neutralizing species may be a halogen and the neutralizing gas-generating composition may include a halide compound that releases the gaseous halogen species when heated (e.g., $AuCl_3$). By way of fourth non-limiting example, the gaseous neutralizing species may be ammonia and the neutralizing gas-generating composition may include a compound containing an ammonia-bearing complex ion (e.g., $[Cu(NH_3)_6]Br_2$, $[Cu(NH_3)_6]Cl_2$, $[Cu(NH_3)_5]SO_4$, $[Cu(NH_3)_4]I_2$, etc.). By way of fifth non-limiting example, the neutralizing gas may be water and the neutralizing gas-generating composition may include a chemical or chemical mixture that yields water when heated (e.g., ammonium nitrate). By way of sixth non-limiting example, the neutralizing gas may be an alcohol and the neutralizing gas-generating composition may include a solid or liquid mass of that alcohol, in which case lower-molecular-weight alcohols (e.g., methanol, ethanol, etc.) may have sufficient vapor pressure with or without heating, and in which case higher-molecular-weight alcohols (e.g., 1-decanol, etc.) will rely upon heating to vaporize. Some alcohols (e.g., phenol) may be able to be used either way (with or without supplemental heating) depending on the application. By way of seventh non-limiting example, the neutralizing gas may be a mixture of two or more species (e.g., ammonia and water) and the neutralizing gas-generating composition may be an ammonium salt (e.g., ammonium bicarbonate). In some embodiments, the neutralizing gas-generating composition may be a mixture of two or more neutralizing gas-generating species, which may produce the same or different gaseous neutralizing species when heated. In yet other embodiments, the neutralizing gas-generating composition may produce two or more distinct species each of which has neutralizing behavior in the system, or only some of which have neutralizing behavior in the system.

In some embodiments, the gas generator device may include two or more neutralizing gas-generating compositions that are configured and/or selected to achieve a selected effect that cannot be achieved by provision of a single neutralizing gas-generating composition. By way of first non-limiting example, the gas generator device may be provided with two or more neutralizing gas-generating compositions that generate different gaseous neutralizing species (which may be effective to neutralize the same or different reactive species), e.g., a first neutralizing gas-generating composition including a hydrated metal salt (to release water vapor as a first gaseous neutralizing species) and a second neutralizing gas-generating composition including a halogen or halide compound (to release the halogen as a second gaseous neutralizing species). By way of second non-limiting example, the gas generator device may be configured such that phase change or decomposition of the first neutralizing gas-generating composition begins before phase change or decomposition of the second neutralizing gas-generating composition, e.g., by arranging the first and second neutralizing gas-generating compositions in sequential compartments or layers that receive heat at different times or rates. In some embodiments, these features may be combined to provide a first gaseous neutralizing species at an earlier point during operation of the gas generator device and a second gaseous neutralizing species at a later point during operation of the gas generator device.

Production of the gaseous neutralizing species from the neutralizing gas-generating composition may take place by any one or more thermally induced chemical or physical mechanisms, such as sublimation, boiling (either of a liquid neutralizing gas-generating composition or after melting of a solid neutralizing gas-generating composition), or thermal decomposition (e.g., release of water molecules from a hydrated salt). It is to be expressly understood that it is not necessary for all of a provided neutralizing gas-generating composition to sublimate, boil, and/or decompose; all that is required is for sufficient vapor pressure of the gaseous neutralizing species to be generated to neutralize the reactive species to a selected extent. In other words, the neutralizing gas-generating composition may in some embodiments be provided in stoichiometric excess of that which is theoretically required to provide the selected extent of neutralization.

In some embodiments, it may not be necessary to react all, or even most of, the reactive species generated by reaction of the product gas-generating composition to provide for a desired safety margin. Particularly, where at least a fraction of the reactive species are in the liquid or solid phase at the conditions that prevail inside the generator device during operation, and/or where liquid or solid particles of the reactive species may coalesce, condense, or deposit in the product gas stream, it may be effective to "coat" or "passivate" these reactive species particles by reacting only the outermost surfaces of the particles with the gaseous neutralizing species, thereby forming particles that have an outer "coating" or "shell" of the less reactive and/or less dangerous species surrounding a "core" of the reactive species. In these embodiments, because the reactive species in the "core" of the particles are not exposed to air, moisture, or other substances with which they may react, the risk of uncontrolled or undesirable reaction (e.g., ignition or explosion) of the reactive species can be mitigated. In one non-limiting example of embodiments of this type, where the gas generator device forms an alkali metal (e.g., sodium) as the reactive species, a hydrated salt (e.g., Epsom salt) may be provided as the neutralizing-gas generating composition only in the amounts needed to form particles comprising a "coating" or "shell" of alkali metal hydroxide around a "core" of elemental alkali metal. Embodiments of the present disclosure may provide the neutralizing gas-generating composition in no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, no more than about 10%, or no more than about 5% of the stoichiometric amount needed to react with all of the reactive species produced by the product gas-generating composition.

In some embodiments, the phase change or decomposition of the neutralizing gas-generating composition, and/or the reaction of the gaseous neutralizing species with the reactive species formed by reaction of the product gas-generating composition, may produce a desired product gas, which may be the same as or different from the product gas generated by reaction of the product gas-generating composition. By way of non-limiting example, where the reactive species is an alkali metal (e.g., sodium metal) and the gaseous neutralizing species is water vapor, reaction between the alkali metal and the water vapor may produce an alkali metal hydroxide and hydrogen gas, which in many embodiments is a desired product gas.

In some embodiments, particularly where the desired product gas is or comprises hydrogen gas, the product gas-generating composition may comprise one or more metal hydrides. Non-limiting examples of metal hydrides suitable for use in gas generator devices as disclosed herein include lithium aluminum hydride ($LiAlH_4$), sodium aluminum hydride ($NaAlH_4$), potassium aluminum hydride ($KAlH_4$), lithium borohydride ($LiBH_4$), sodium borohydride ($NaBH_4$), potassium borohydride ($KBH_4$), lithium hydride (LiH), sodium hydride (NaH), potassium hydride (KH), magnesium hydride ($MgH_2$), calcium hydride ($CaH_2$), and mixtures thereof.

The heat-generating composition can be a thermite composition, i.e., a mixture of a metal oxide and a metal. The metal oxide may, but need not, be selected from the group consisting of vanadium(V) oxide, iron(III) oxide, iron(II,III) oxide, copper(II) oxide, copper(I) oxide, tin(IV) oxide, titanium dioxide, manganese dioxide, manganese(III) oxide, chromium(III) oxide, cobalt(II) oxide, silicon dioxide, nickel(II) oxide, silver oxide, molybdenum trioxide, lead(II,IV) oxide, bismuth(III) oxide, and combinations thereof, and the metal may, but need not, be selected from the group consisting of aluminum, magnesium, silicon, manganese, an alloy of magnesium and aluminum, and combinations thereof. The thermite composition may, but need not, comprise more than one metal, more than one metal oxide, or both.

To start the generator, the heat-generating composition, e.g., thermite mixture (such as but not limited to a mixture of aluminum metal and iron(III) oxide), can be ignited to produce heat. As heat or thermal energy is conducted from the heat-generating composition to the product gas-generating composition, e.g., a metal hydride, a gas or mixture of gases is initially produced as the product gas-generating composition decomposes. A gaseous neutralizing species is also produced due to phase change and/or thermal decomposition of the neutralizing gas-generating composition, and this gaseous neutralizing species, upon contacting reactive species (e.g., elemental alkali metals or reactive metal hydrides), reacts with the reactive species to produce a less reactive and/or less dangerous species (e.g., alkali metal hydroxides, alkali metal halides) and, in some embodiments, further and/or additional product gas(es).

Various embodiments of the gas generator device will now be discussed with reference to the figures.

FIG. 1 depicts a non-limiting configuration of a gas generator device 100. The gas generator device 100 comprises a first compartment 101 containing a heat-generating composition, a second compartment 102 containing a first gas-generating composition (e.g., a metal hydride), and a third compartment 103 containing a second gas-generating composition. The first gas-generating composition may be a product gas-generating composition and the second gas-generating composition may be a neutralizing gas-generating composition, or vice versa. The compartments 101, 102, 103 are typically separated from an outside environment by a wall 111. The first compartment 101 and the second compartment 102 are separated from each other by a first separator 104a, and the second compartment 102 and the third compartment 103 are separated from each other by a second separator 104b. In some embodiments, the gas generator device 100 may further comprise a fourth compartment, and/or a fifth compartment, and/or a sixth compartment, etc., each separated from adjacent compartments by a third, fourth, fifth, etc. separator and each containing a third, fourth, fifth, etc. gas-generating composition, each of which may be the same as or different from (and provided in the same or different quantities as) either or both of the first and second gas-generating compositions. In many, but not necessarily all, embodiments, the compartments are thermally "connected" in series (i.e., the first compartment 101 is primarily in thermal contact only with the second compartment 102 via the first separator 104a, the second compartment 102 is primarily in thermal contact only with the first compartment 101 via the first separator 104a and the second compartment 102 is primarily in thermal contact with the third compartment 103 via the second separator 104b, the third compartment 103 is primarily in thermal contact only with the second compartment 102 via the second separator 104b and, if provided, a fourth compartment via a third separator, etc.). Separators 104 may make incidental contact with other structures such as the wall 111 or other separators 104. In some embodiments, either or both of the second 102 and third 103 compartments (and fourth, etc. compartments, if provided) may be divided into two or more sub-compartments, each containing a portion of the respective gas-generating composition. Sub-compartments of the same compartment may be in thermal contact with each other (i.e., may be separated by a thermally conductive separator), or may be substantially thermally isolated from each other (i.e., may be separated by a substantially thermally insulating separator). It is to be expressly understood that consecutive pairs of compartments (e.g., the first 101 and second 102 compartments, and/or the second 102 and third 103 compartments), may, but need not, be completely isolated or sealed from one another; in some embodiments, there may be one or more gaps, passages, spaces, or voids (e.g., about a circumferential edge of the separator 104) that allow gases or other materials to pass from one of the compartments, e.g., the first compartment 101, adjacent to a first face, side, or surface of a separator 104, to the other compartment, e.g., the second compartment 102, adjacent to a second face, side, or surface of the same separator 104.

In operation of the embodiment of the gas generator device 100 illustrated in FIG. 1, thermal energy generated in the first compartment 101 by reaction of the heat-generating composition is transferred first to the second compartment 102 by the first separator 104a, whereby at least some of the thermal energy transferred to the second compartment 102 causes at least some of the first gas-generating composition to release a first gas, which may be either a product gas or a neutralizing gas. Then, as the temperature in the second compartment 102 increases, thermal energy begins to be transferred from the second compartment 102 to the third compartment 103 by the second separator 104b, whereby at least some of the thermal energy transferred to the third compartment 103 causes at least some of the second gas-generating composition to release the other of the product gas and the neutralizing gas.

The first 101, second 102, and third 103 compartments have first, second, and third compartment volumes, respectively. The gas generator device 100 has a device volume. In some configurations the device volume can be the sum of the first 101, second 102, and third 103 compartment volumes. In some configurations, the device volume can be more than the sum of the first 101, second 102, and third 103 compartment volumes. In some configurations, the first 101, second 102, and third 103 compartments can be stacked one atop the other. In other configurations, the first compartment 101 may be encased within the second compartment 102 and the second compartment 102 may be encased within the third compartment 103, as for example depicted without limitation in FIG. 1, or vice versa.

In some embodiments, the first compartment 101 is configured with one or more vents (not depicted).

Most typically, the heat-generating composition comprises a thermite composition, which in turn comprises a metal (i.e., a fuel) and a metal oxide (i.e., an oxidizer). The thermite reaction, i.e., the exothermic reduction-oxidation reaction between a metal fuel and a metal oxide when ignited by heat, has been known for well over a century; see, e.g., U.S. Pat. No. 906,009, entitled "Manufacture of thermic mixtures," issued 8 Dec. 1908 to Goldschmidt ("Goldschmidt"), the entirety of which is incorporated herein by reference. The thermite reaction is generally non-explosive but can create intense heat and high temperatures; it thus finds a variety of useful applications, e.g., welding, metal refining, disabling munitions, incendiary weapons, and pyrotechnic initiators. The metal oxide may, but need not, be selected from the group consisting essentially of vanadium (V) oxide, iron(III) oxide, iron(II,III) oxide, copper(II) oxide, copper(I) oxide, tin(IV) oxide, titanium dioxide, manganese dioxide, manganese(III) oxide, chromium(III) oxide, cobalt(II) oxide, silicon dioxide, nickel(II) oxide, silver oxide, molybdenum trioxide, lead(II,IV) oxide, bismuth(III) oxide, and combinations thereof, and the metal may, but need not, be selected from the group consisting of aluminum, magnesium, silicon, manganese, an alloy of magnesium and aluminum, and combinations thereof. The thermite composition may, but need not, comprise more than one metal, more than one metal oxide, or both.

In one configuration, the heat-generating composition comprises a thermite composition that comprises a mixture of ferric oxide and aluminum. The chemical reaction of this thermite mixture is shown below in chemical equation (2):

$$Fe_2O_3(s)+2Al(s)\rightarrow 2Fe(s)+Al_2O_3(s) \qquad (2)$$

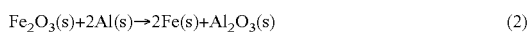

The thermite chemical reaction is exothermic and releases a large quantity of thermal energy, resulting in temperatures sufficient to produce an aluminum oxide slag and molten iron. The enthalpy or heat of reaction ($\Delta H°$ value) for the thermite reaction is about −849 kJ (e.g., −849 kJ per mole $Fe_2O_3$). The thermite reaction does not require external oxygen and can, therefore, proceed in locations with limited or no air flow (e.g., in space), or even under water. Furthermore, the reaction of many types and mixtures of thermite does not produce any significant quantity of gases which might carry away some of the heat of the reaction or produce an explosive excess of pressure.

It can be appreciated that the heat-generating composition can generate very large amounts of thermal energy per unit mass of the heat-generating composition. A compact gas generating system can thus be achieved by producing such large amounts of thermal energy per unit mass of the heat-generating composition. Furthermore, in many embodiments, substantially most of the heat generated remains available to decompose the metal hydrides or other gas-generating compositions because gaseous byproducts are not produced; that is, most of the heat is retained in the liquid and/or solid reaction products as a source of thermal energy.

Typically, in the embodiment of the gas generator device 100 illustrated in FIG. 1, at least some of the thermal energy transferred to the second compartment 102 by the first separator 104a causes at least some of the first gas-generating composition contained in the second compartment 102 to release a first gas or mixture of gases, which comprises either a product gas or a neutralizing gas. In turn, at least some of the thermal energy transferred to the third compartment 103 by the second separator 104b causes at least some of the second gas-generating composition contained in the third compartment 103 to release a second gas or mixture of gases, which comprises the other of the product gas and the neutralizing gas. The rate at which the first separator 104a transfers heat from the first compartment 101 to the second compartment 102 may be substantially the same as or different from the rate at which the second separator 104b transfers heat from the second compartment 102 to the third compartment 103 (which may be the same as or different from the rate at which a third separator, if provided, transfers heat from the third compartment 103 to a fourth compartment, etc.). The materials and physical structure and/or orientation of the two (or more) separators 104 may be optimized, selected, and/or tuned to provide a desired heat transfer profile between any two consecutive compartments. The quantity and/or rate of production of the product gas may be the same as, or different from, the quantity and/or rate of production of the neutralizing gas.

In some embodiments, at least about 99 mole % of the product gas-generating composition, e.g., metal hydride, may be converted to the product gas(es). More generally, at least 95 mole %, even more generally at least about 90 mole %, yet even more generally at least about 80 mole %, still yet even more generally at least about 70 mole %, still yet even more generally at least about 60 mole %, still yet even more generally at least about 50 mole %, still yet even more generally at least about 40 mole %, still yet even more generally at least about 30 mole %, still yet even more generally at least about 20 mole %, or yet still even more generally at least about 10 mole % of the product gas-generating composition may be converted to the product gas(es).

In some embodiments, at least about 99 mole % of the neutralizing gas-generating composition, e.g., hydrated metal salt, halogen or halide salt, etc., may be converted to the neutralizing gas(es). More generally, at least 95 mole %, even more generally at least about 90 mole %, yet even more generally at least about 80 mole %, still yet even more generally at least about 70 mole %, still yet even more generally at least about 60 mole %, still yet even more generally at least about 50 mole %, still yet even more generally at least about 40 mole %, still yet even more generally at least about 30 mole %, still yet even more generally at least about 20 mole %, or yet still even more generally at least about 10 mole % of the neutralizing gas-generating composition may be converted to the neutralizing gas(es).

It can be appreciated that, in many embodiments, there is no need to control one or both of the temperature or thermal energy transfer within the device 100 after reaction of the heat-generating composition in the first compartment 101 has been initiated. As a result, the device 100 can be configured (e.g., by optimizing, selecting, and/or tuning the materials and physical structure and/or orientation of the separators 104) to transfer thermal energy between any two adjacent compartments at any desired rate; by way of non-limiting example, the device 100 may be configured such that the first separator 104*a* has a high thermal conductivity and transfers heat rapidly from the first compartment 101 to the second compartment 102 and thereby provide an initial rapid "burst" of product gas(es), and such that the second separator 104*b* has a lower thermal conductivity and transfers heat more slowly from the second compartment 102 to the third compartment 103 to provide a slower, steadier stream of neutralizing gas. Moreover, the device 100 can be more easily constructed and operated than other gas generators; for example, there is not always a need to have the conversion of the product gas-generating composition and/or neutralizing gas-generating composition occur at any specific temperature, so neither the reaction of the heat-generating composition nor the transfer of thermal energy from the first 101 to the second 102 compartment or from the second 102 to the third 103 compartment must necessarily be closely regulated after reaction of the heat-generating composition is initiated. This contrasts with catalytic decomposition methods, which require the catalyst to be operated at specific temperatures, pressures, and reactant flow rates. Even more advantageously, in those embodiments where control over one or both of the temperature or the rate of energy transfer within the device 100 is required or desired, such control can be achieved by varying the chemical makeup of the thermite or other heat-generating composition within the first compartment 101, without the need to redesign the device 100 itself.

The gas generator device 100 may further include an igniter 105 interconnected with the first compartment 101. The igniter 105 causes the ignition of the heat-generating composition. In some configurations, a spark generated within the igniter 105 initiates the ignition process. In other configurations, the ignition process is initiated by thermal energy generated within the igniter 105. The thermal energy provided within igniter 105 may be from a hot wire. In other configurations, the initiating energy within igniter 105 may be from flame. In other configurations, the initiating energy within the igniter 105 may be provided by friction.

The igniter 105 may further comprise an ignition aperture in the first compartment 101. The ignition aperture may be configured with a safety-delay switch system.

Although not illustrated in FIG. 1, in some embodiments, the gas generator device 100 may further include a second, separate igniter and associated heat-generating composition interconnected with the compartment in which the neutralizing gas-generating composition is provided, e.g., the third compartment 103. This igniter and associated heat-generating composition may initiate the thermal decomposition and/or phase change in the neutralizing gas-generating composition to release the neutralizing gas. In some configurations, a spark generated within the igniter initiates the release of the neutralizing gas. In other configurations, the neutralizing gas is initiated by thermal energy generated within the igniter. The thermal energy provided within the igniter may be from a hot wire. In other configurations, the initiating energy within the igniter may be from flame. In other configurations, the initiating energy within the igniter may be provided by friction. The igniter may further comprise an ignition aperture in the compartment with which it is interconnected, e.g., the third compartment 103. The ignition aperture may be configured with a safety-delay switch system.

The gas generator device 100 may further include a heat exchanger 106 interconnected with one or more of the second compartment 102 and the third compartment 103 (and, if provided, the fourth, fifth, etc. compartments). The heat exchanger 106 is configured to cool either or both of the product gas(es) and the neutralizing gas(es). In accordance with some embodiments, the heat exchanger 106 may be interconnected to an outlet 107*a* of the third compartment 103, as illustrated in FIG. 1. In the embodiment illustrated in FIG. 1, the exchanger 106 cools product gas(es) exiting the third compartment 103 through outlet 107*a* and releases the cooled product gas(es) through outlet 107*b*.

It is to be expressly understood that that the first 101, second 102, and third 103 compartments can be spatially arranged in any suitable configuration. By way of non-limiting example, in some embodiments, the compartments can be stacked atop each other, while in other embodiments one compartment can be encased within or surrounded by another compartment that in turn is encased within or surrounded by another compartment, the compartments may lie in a horizontal plane (e.g., the first compartment 101 may be a "left" compartment, the second compartment 102 may be a "middle" compartment, and the third compartment 103 may be a "right" compartment, or vice versa), or the compartments may have a more complex geometric relationship (e.g., the separators 104 may be spiral-shaped, with the first compartment 101 lying adjacent to an outer surface of the spiral-shaped first separator 104a, the second compartment 102 lying adjacent to an inner surface of the spiral-shaped first separator 104a and an outer surface of the spiral-shaped second separator 104b, and the third compartment 103 lying adjacent to an inner surface of the spiral-shaped second separator 104b, or vice versa).

In some embodiments, any one or more separators 104 may be constructed principally of a combination or mixture of at least two different materials, such as a metal alloy. Non-limiting examples of such combinations and mixtures include steel and copper. The combination or mixture may be substantially homogeneous, or may be provided in a spatially varying form, i.e., where certain regions of a separator 104 are particularly rich (or poor) in a selected component of the combination or mixture.

Figure 2:
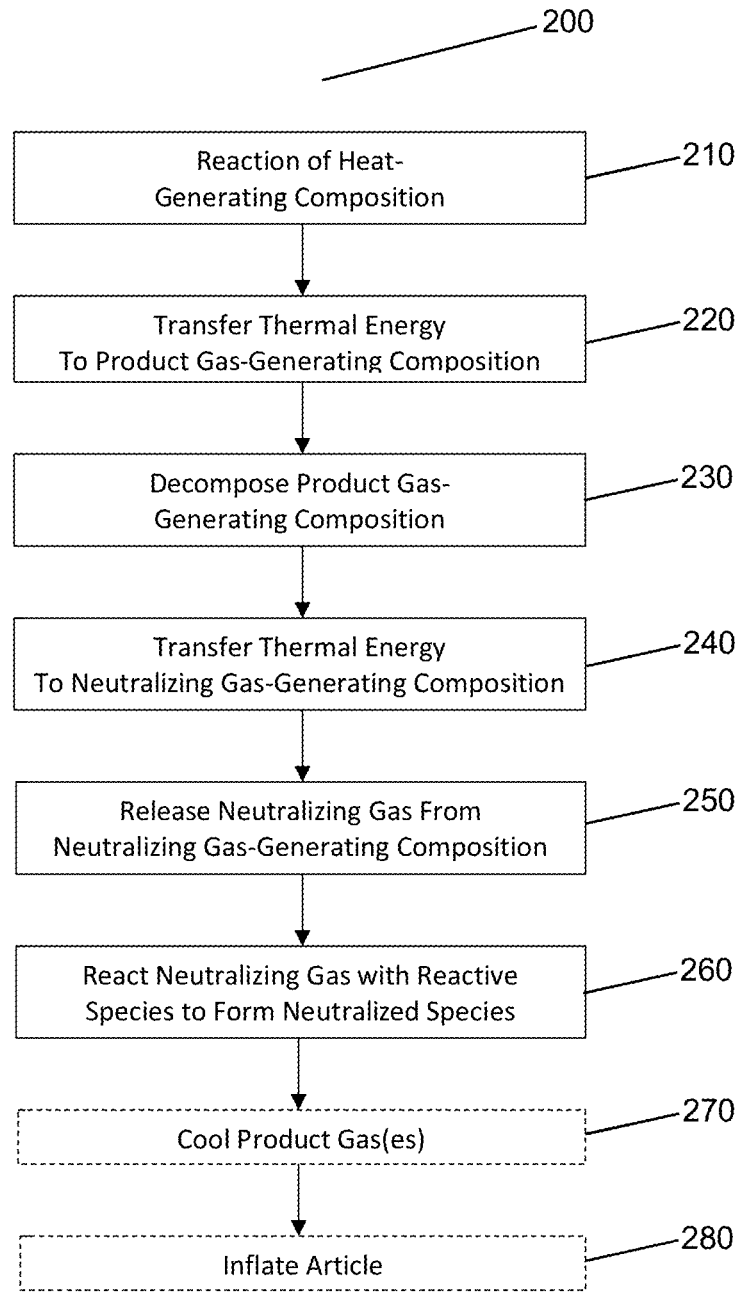
FIG. 2 depicts a process according to some embodiments of the present disclosure.

FIG. 2 depicts a process 200 for using a gas generator device, such as the gas generator device 100 of FIG. 1.

In step 210, reaction of a heat-generating composition is initiated. The reaction releases thermal energy. The heat-generating composition may be a thermite composition comprised of a metal and a metal oxide. The metal oxide may, but need not, be selected from the group consisting of vanadium(V) oxide, iron(III) oxide, iron(II,III) oxide, copper(II) oxide, copper(I) oxide, tin(IV) oxide, titanium dioxide, manganese dioxide, manganese(III) oxide, chromium(III) oxide, cobalt(II) oxide, silicon dioxide, nickel(II) oxide, silver oxide, molybdenum trioxide, lead(II,IV) oxide, bismuth(III) oxide, and combinations thereof, and the metal may, but need not, be selected from the group consisting of aluminum, magnesium, silicon, manganese, an alloy of magnesium and aluminum, and combinations thereof. The thermite composition may, but need not, comprise more than one metal, more than one metal oxide, or both.

Step 210 may further include contacting the heat-generating composition with an igniter to initiate the reaction. In some configurations the reaction may be initiated by contacting the igniter with one of a hot wire or a spark. In other configurations, flame may initiate the reaction of the heat-generating composition via the igniter. In yet other configurations, friction may initiate reaction of the heat-generating composition via the igniter.

In step 220, at least a portion of the thermal energy released by the reaction of the heat-generating composition is transferred to a product gas-generating composition, which may be, e.g., a metal hydride. Non-limiting examples of metal hydrides suitable for use include lithium aluminum hydride ($LiAlH_4$), sodium aluminum hydride ($NaAlH_4$), potassium aluminum hydride ($KAlH_4$), lithium borohydride ($LiBH_4$), sodium borohydride ($NaBH_4$), potassium borohydride ($KBH_4$), lithium hydride (LiH), sodium hydride (NaH), potassium hydride (KH), magnesium hydride ($MgH_2$), calcium hydride ($CaH_2$), and combinations and mixtures thereof. In embodiments, step 220 typically includes transferring thermal energy through a first separator 104a at a first heat transfer rate.

In step 230, the thermal energy transferred to the product gas-generating composition begins to decompose the product gas-generating composition to release a product gas or mixture of gases (e.g., hydrogen gas) and one or more reactive species (e.g., alkali metals in elemental form, alkali metal hydrides, etc.). The material and construction of the first separator 104a, and the composition and amount of the product gas-generating composition, can be selected to provide for a desired amount or rate of production of the product gas(es).

In step 240, thermal energy is imparted to a neutralizing gas-generating composition, e.g. a hydrated metal salt, a halogen, a halide salt, etc. In embodiments, step 240 may include imparting thermal energy to the neutralizing gas-generating composition through a second separator 104b at a second heat transfer rate, which may be similar to or different from the first heat transfer rate.

In step 250, the thermal energy transferred to the neutralizing gas-generating composition begins to cause the neutralizing gas-generating composition to undergo phase change (e.g., sublimation, vaporization) and/or thermal decomposition to release a neutralizing gas. The material and construction of the second separator 104b, and the composition and amount of the neutralizing gas-generating composition, can be selected to provide for a desired amount or rate of production of the neutralizing gas. The heat used to evolve the neutralizing gas from the neutralizing gas-generating composition may be derived from any one or more sources. By way of first non-limiting example, at least a portion of this heat may be transferred to the neutralizing gas-generating composition by physical contact with the hot product gas(es) generated by reaction of the product gas-generating composition in step 230. By way of second non-limiting example, at least a portion of this heat may be residual or waste heat from reaction of the heat-generating composition in step 210 and/or reaction of the product gas-generating composition (where this reaction is exothermic) in step 230. By way of third non-limiting example, at least a portion of this heat may be provided by the same ignition or initiation source used to initiate reaction of the heat-generating composition in step 210. By way of fourth non-limiting example, at least a portion of this heat may be provided by a separate, dedicated portion of heat-generating composition or a separate heating element. Of course, some embodiments will feature a combination of two, three, or all four of these configurations, as well as others that will be appreciated by those of ordinary skill in the art in view of this disclosure.

It is to be expressly understood that in some embodiments, steps 240 and 250 may be carried out before or simultaneously with steps 220 and 230. In other words, it is not necessary that thermal decomposition of the product gas-generating composition to release the product gas begin before thermal decomposition and/or phase change of the neutralizing gas-generating composition to release the neutralizing gas. By way of first non-limiting example, the product gas-generating composition may be provided in a third compartment 103 and the neutralizing gas-generating composition may be provided in a second compartment 102 of a gas generator device 100 as illustrated in FIG. 1 (such that the neutralizing gas begins to be produced before the product gas begins to be produced). By way of second non-limiting example, the product gas-generating composition and neutralizing gas-generating composition may be provided in a common compartment or in separate compartments that are both in thermal contact with a first compartment 101 of a gas generator device 100 as illustrated in FIG. 1 (such that the neutralizing gas and the product gas begin to be produced simultaneously or approximately simultaneously).

It is also expressly to be understood that in some embodiments the vapor pressure of the neutralizing gas alone is adequate to achieve the objectives and no heating step 240 is required. In that case, simple exposure of the neutralizing gas-generating material to the ambient environment inside the generator is sufficient and may be achieved by causing a sealed reservoir of that material to open.

In step 260, the neutralizing gas (e.g., water vapor, halogen, etc.) mixes throughout any volume in which the reactive species may be located, such as, by way of non-limiting example, an internal volume of the generator, a volume or vessel with which the generator is in fluid communication and that is configured to receive the product gas, and/or transfer lines and exit paths therebetween. Upon contacting the reactive species, the gaseous neutralizing species reacts with the reactive species to form a less reactive and/or less dangerous species (e.g., alkali metal hydroxide, alkali metal halide, etc.), thereby reducing or eliminating the hazards of the reactive species. It is to be expressly understood that step 260 may, and in many embodiments does, begin while any one or more of steps 220 through 250 is continuing.

In optional step 270, one or both of the product gas and any excess/residual neutralizing gas may be cooled, in some embodiments by a heat exchanger.

In optional step 280, the product gas may be used for one of: inflation of a meteorological balloon; inflation of other types of balloons; inflation of a blimp; inflation of a hypersonic inflatable aerodynamic decelerator (HIAD); inflation of an inflatable article; pressurization of a gas storage cylinder; and the like.

It is to be expressly understood that in embodiments of the method that include steps 270 and/or 280, these steps are not necessarily strictly sequential with steps 230 through 260. Rather, at least a portion of one or more product and/or neutralizing gases may begin to cool (as in step 270) and/or exit the generator device and begin to inflate an inflatable device or pressurize a cylinder (as in step 280) as soon as these gases begin to be evolved in step 230 and/or step 250. Thus, the cooling step 270 and inflation/pressurization step 280 may begin while the production of the product and/or neutralizing gases in steps 230 and 250 is continuing/ongoing.

Figure 3:
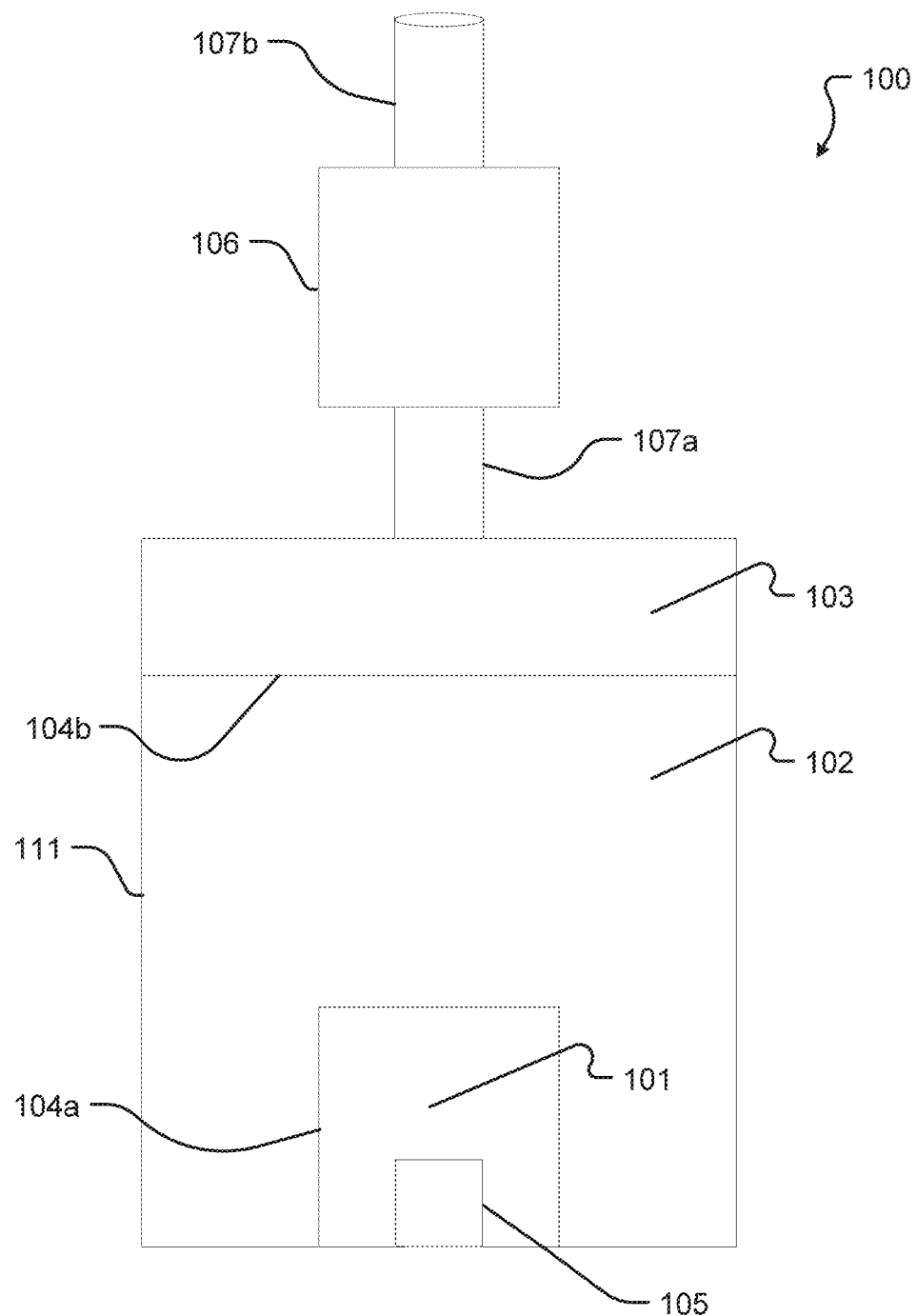
FIG. 3 depicts another device for generating a desired gas or mixture of gases according to some embodiments of the present disclosure.

FIG. 3 depicts an alternative embodiment of the gas generator device 100 illustrated in FIG. 1. In the embodiment illustrated in FIG. 3, the third compartment 103 is stacked on top of the second compartment 102, rather than surrounding/encapsulating it as in FIG. 1.

Referring now to FIGS. 4A through 4E, a non-limiting configuration of a gas generator device 100 is illustrated at various stages of construction. The container initially (FIG. 4A) includes an upper chamber 10, a middle chamber 20, and a lower chamber 30, which, after placement of a first separator 104a (FIGS. 4B, 4C), become upper 101, middle 102, and lower 103 compartments of the gas generator device 100. The chambers 10,20,30 are separated from an outside environment by a base wall 111a and side walls 111b,c After placement of first and second separators 104a,b, the upper chamber 10 and the middle chamber 20 are separated from each other by the first separator 104a, and the middle chamber 20 and the lower chamber 30 are separated from each other by the second separator 104b. It is to be expressly understood that after placement of the separators 104a,b, consecutive pairs of compartments (e.g., the upper 101 and middle 102 compartments, and/or the middle 102 and lower 103 compartments) may, but need not, be completely isolated or sealed from one another; in some embodiments, there may be one or more gaps, passages, spaces, or voids (e.g., about a circumferential edge of the separator 104) that allow gases or other materials to pass from one of the compartments, e.g., the middle compartment 102, adjacent to a first face, side, or surface of a separator 104, to the upper compartment 101, adjacent to a second face, side, or surface of the separator 104, or vice versa. After placement of the separators 104, each separator is primarily in thermal contact only with the two compartments to which it is adjacent. In some embodiments, the gas generator device 100 may further comprise a fourth compartment, and/or a fifth compartment, and/or a sixth compartment, etc. below the lower compartment 103, between which may be placed third, fourth, fifth, etc. separators to separate these compartments from the adjacent compartments. In many, but not necessarily all, embodiments, the compartments are thermally "connected" in series (i.e., the first compartment 101 is primarily in thermal contact only with the second compartment 102 via the first separator 104a, the second compartment 102 is primarily in thermal contact only with the first compartment 101 via the first separator 104a and the second compartment 102 is primarily in thermal contact only with the third compartment 103 via the second separator 104b, the third compartment 103 is primarily in thermal contact only with the second compartment 102 via the second separator 104b and, if provided, a fourth compartment via a third separator, etc.). Separators 104 may make incidental contact with other structures such as the wall 111 or other separators 104. In some embodiments, either or both of the middle 102 and lower 103 compartments (and fourth, etc. compartments, if provided) may be divided into two or more sub-compartments. Sub-compartments of the same compartment may be in thermal contact with each other (i.e., may be separated by a thermally conductive separator), or may be substantially thermally isolated from each other (i.e., may be separated by a substantially thermally insulating separator).

The upper chamber 10/upper compartment 101, middle chamber 20/middle compartment 102, and lower chamber 30/lower compartment 103 have first, second, and third volumes, respectively. The gas generator device 100 has a device volume. In some configurations the device volume can be the sum of the upper 101, middle 102, and lower 103 compartment volumes. In some configurations, the device volume can be more than the sum of the upper 101, middle 102, and lower 103 compartment volumes. Although the upper 101, middle 102, and lower 103 compartments are, in the embodiment illustrated in FIGS. 4A through 4E, stacked one atop the other, it will be appreciated that other spatial configurations are also possible; by way of non-limiting example, the compartments may lie in a horizontal plane (e.g., the upper compartment 101 may instead be a "left" compartment and the lower compartment 103 may instead be a "right" compartment, or vice versa), or the compartments may have a more complex geometric relationship (e.g., the separators 104 may be spiral-shaped, with the upper compartment 101 lying adjacent to an outer surface of the spiral-shaped first separator 104a, the middle compartment 102 lying adjacent to an inner surface of the spiral-shaped first separator 104a and an outer surface of the spiral-shaped second separator 104b, and the lower compartment 103 lying adjacent to an inner surface of the spiral-shaped second separator 104b, or vice versa). One or more of walls 111a,b,c may comprise, separately and independently, one or more of steel, aluminum, and ceramic.

In some embodiments, the upper compartment 101 is configured with one or more vents (not depicted).

Figure 4A:
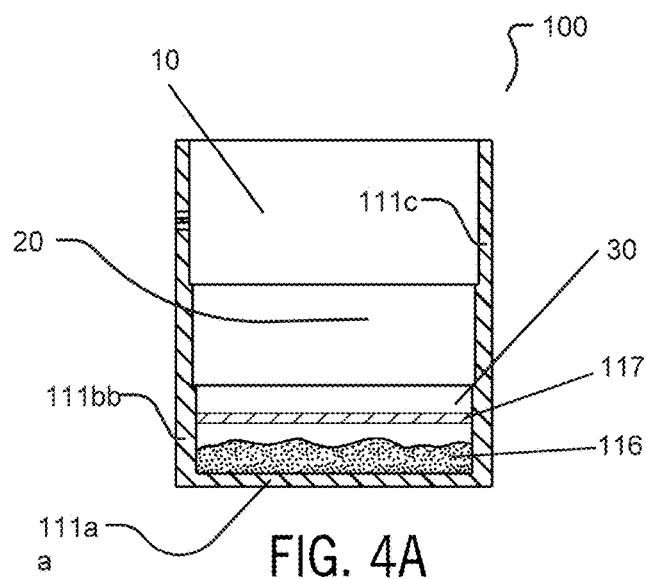
FIG. 4A illustrates a first compartment of a device for generating a desired gas or mixture of gases according to some embodiments of the present disclosure.

As illustrated in FIG. 4A, after provision of the container having base wall 111a and side walls 111b,c, construction of the gas generator device 100 proceeds by placing a second gas-generating composition 116, into the lower chamber 30, which initially may not be physically separated from the middle chamber 20 and/or upper chamber 10 (the lines between the three chambers in FIG. 4A are shown only for the purpose of illustrating the delineation between the chambers and do not necessarily represent physical barriers). The second gas-generating composition 116 may be either a product gas-generating composition (e.g., a metal hydride) or a neutralizing gas-generating composition (e.g., a hydrated metal salt, an elemental halogen, a thermally decomposable halide, etc.); for ease of disclosure, it will be assumed for the remainder of the discussion of FIGS. 4A through 4E that the second gas-generating composition 116 is a neutralizing gas-generating composition and the first gas-generating composition 114 further described below is a product gas-generating composition, but it is to be expressly understood that the reverse may be true, mutatis mutandis. The second gas-generating composition may be provided in forms such as but not limited to powders, pellets, sheets, tubes, rods, fibers, or custom molded shapes.

Optionally, a second sealing element 117 may then be placed over the second gas-generating composition 116 to hold the second gas-generating composition 116 in place in the lower chamber 30; the second sealing element 117, if provided, may be in direct physical contact with the second gas-generating composition 116, or, as illustrated in FIG. 4A, there may be a gap or headspace between the second gas-generating composition 116 and the second sealing element 117. In some embodiments, the second sealing element 117 may be a relatively thin and/or flexible component, and/or may be constructed of material(s) having a relatively low melting, vaporization, and/or sublimation temperature, such that the second sealing element 117 melts, vaporizes, sublimates, or otherwise disintegrates during operation of the gas generator device 100; one example of a suitable material for a second sealing element 117 of this type is aluminum foil.

Figure 4B:
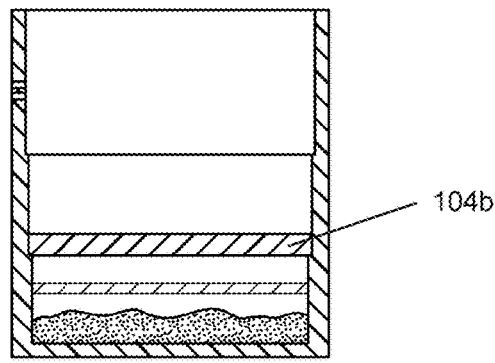
FIG. 4B illustrates a first compartment and a first separator of a device for generating a desired gas or mixture of gases according to some embodiments of the present disclosure.

As illustrated in FIG. 4B, after placement of the second gas-generating composition 116 (or, optionally, the second sealing element 117) into the lower chamber 30, construction of the gas generator device 100 proceeds by placing a second separator 104b into the container to physically separate the middle 20 and lower 30 chambers, such that the middle chamber 20 thereby becomes a middle compartment 102 and the lower chamber 30 thereby becomes a lower compartment 103. The first separator 104a is in thermal contact with the middle 102 and lower 103 compartments. In this way, thermal energy in the middle compartment 102 can be transferred to the lower compartment 103 by the second separator 104b, whereby at least some of the thermal energy transferred to the lower compartment 103 causes phase change and/or thermal decomposition of at least some of the second gas-generating composition 116 to release the corresponding gas (in this case, a neutralizing gas).

It is to be expressly understood that after placement of the second separator 104b, the middle 102 and lower 103 compartments, may, but need not, be completely isolated or sealed from one another; in some embodiments, there may be one or more gaps, passages, spaces, or voids (e.g., about a circumferential edge of the second separator 104b) that allow gases or other materials to pass from the lower compartment 103, adjacent to a first face, side, or surface of the second separator 104b, to the middle compartment 102, adjacent to a second face, side, or surface of the second separator 104b, or vice versa. By way of non-limiting example, side walls 111b,c may be curved such that the container forming the body of the gas generator device 100 is cylindrical or approximately cylindrical, and the second separator 104b may be a disk having a diameter smaller than an interior diameter of the cylindrical container and supported by any suitable means (e.g., resting on catches or stops provided for that purpose inside the gas generator device 100, or directly on top of the second gas-generating composition 116 or second sealing element 117), such that product gas(es) formed by reaction of the second gas-generating composition 116, or other materials, can pass from the lower compartment 103 to the middle compartment 102 (or vice versa) via an annular space between the circumferential edge of the second separator 104b and side walls 111b,c.

Figure 4C:
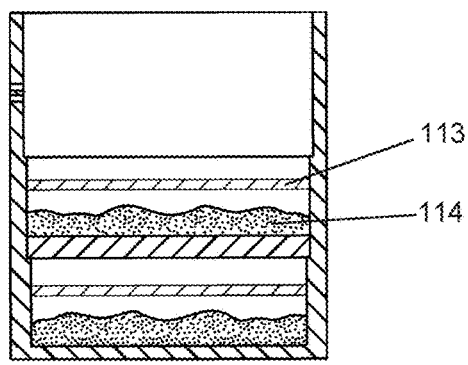
FIG. 4C illustrates a first compartment, a first separator, and a second compartment of a device for generating a desired gas or mixture of gases according to some embodiments of the present disclosure.

As illustrated in FIG. 4C, after placement of the second separator 104b into the container to define and separate the middle 102 and lower 103 compartments, construction of the gas generator device 100 proceeds by placing a first gas-generating composition 114, which is the product gas-generating composition if the second gas-generating composition 116 is the neutralizing gas-generating composition (and vice versa), into the middle chamber 20, which initially may not be physically separated from the upper chamber 10 (the line between the two chambers in FIG. 4C is shown only for the purpose of illustrating the delineation between the chambers and does not necessarily represent a physical barrier). The first gas-generating composition 114 may be in forms such as but not limited to pellets, sheets, tubes, rods, fibers, or custom molded shapes.

Optionally, a first sealing element 113 may then be placed over the first gas-generating composition 114 to hold the first gas-generating composition 114 in place in the middle chamber 20; the first sealing element 113, if provided, may be in direct physical contact with the first gas-generating composition 114, or, as illustrated in FIG. 4C, there may be a gap or headspace between the first gas-generating composition 114 and the first sealing element 113. In some embodiments, the first sealing element 113 may be a relatively thin and/or flexible component, and/or may be constructed of material(s) having a relatively low melting, vaporization, and/or sublimation temperature, such that the first sealing element 113 melts, vaporizes, sublimates, or otherwise disintegrates during operation of the gas generator device 100; one example of a suitable material for a first sealing element 113 of this type is aluminum foil.

Figure 4D:
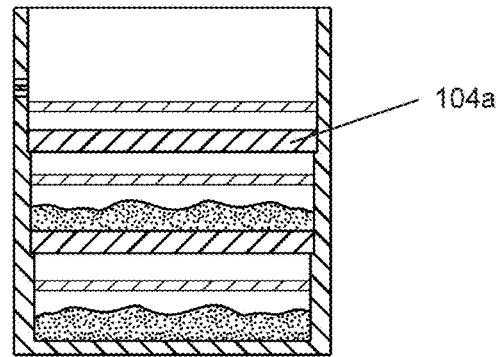
FIG. 4D illustrates a first compartment, a first separator, a second compartment, and a second separator of a device for generating a desired gas or mixture of gases according to some embodiments of the present disclosure.

As illustrated in FIG. 4D, after placement of the first gas-generating composition 114 (or, optionally, the first sealing element 113) into the middle chamber 20, construction of the gas generator device 100 proceeds by placing a first separator 104a into the container to physically separate the upper 10 and middle 20 chambers, such that the upper chamber 10 thereby becomes an upper compartment 101. The first separator 104a is in thermal contact with the upper 101 and middle 102 compartments. In this way, thermal energy in the upper compartment 101 can be transferred to the middle compartment 102 by the first separator 104a, whereby at least some of the thermal energy transferred to the middle compartment 102 causes phase change and/or thermal decomposition of at least some of the first gas-generating composition 114 to release the corresponding gas (in this case, the product gas).

It is to be expressly understood that after placement of the first separator 104a, the upper 101 and middle 102 compartments, may, but need not, be completely isolated or sealed from one another; in some embodiments, there may be one or more gaps, passages, spaces, or voids (e.g., about a circumferential edge of the first separator 104a) that allow gases or other materials to pass from the middle compartment 102, adjacent to a first face, side, or surface of the first separator 104a, to the upper compartment 101, adjacent to a second face, side, or surface of the first separator 104a, or vice versa. By way of non-limiting example, side walls 111b,c may be curved such that the container forming the body of the gas generator device 100 is cylindrical or approximately cylindrical, and the first separator 104a may be a disk having a diameter smaller than an interior diameter of the cylindrical container and supported by any suitable means (e.g., resting on catches or stops provided for that purpose inside the gas generator device 100, or directly on top of the first gas-generating composition 114 or first sealing element 113), such that product gas(es) formed by reaction of the first gas-generating composition 114, or other materials, can pass from the middle compartment 102 to the upper compartment 101 (or vice versa) via an annular space between the circumferential edge of the first separator 104a and side walls 111b,c.

In some embodiments, any one or more separators 104 may be constructed principally of a combination or mixture of at least two different materials, such as a metal alloy. Non-limiting examples of such combinations and mixtures include steel and brass. The combination or mixture may be substantially homogeneous, or may be provided in a spatially varying form, i.e., where certain regions of the separator 104 are particularly rich (or poor) in a selected component of the combination or mixture.

Figure 4E:
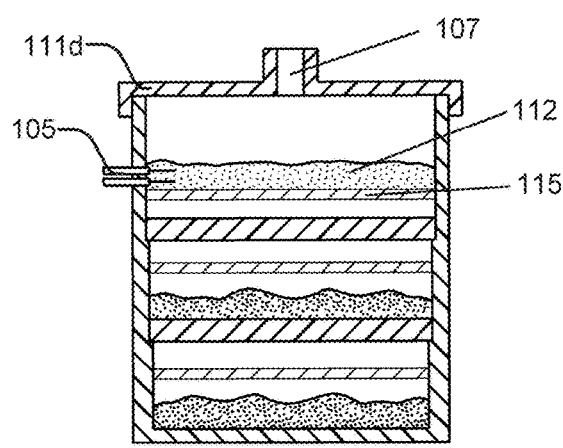
FIG. 4E illustrates a first compartment, a first separator, a second compartment, a second separator, and a third compartment of a device for generating a desired gas or mixture of gases according to some embodiments of the present disclosure.

As illustrated in FIG. 4E, after placement of the first separator 104a into the container to define and separate the upper 101 and middle 102 compartments, construction of the gas generator device 100 proceeds by placing a heat-generating composition 112, such as a thermite composition, into the upper compartment 101. Where the heat-generating composition 112 is a thermite composition, a metal oxide of the thermite composition may, but need not, be selected from the group consisting essentially of vanadium(V) oxide, iron(III) oxide, iron(II,III) oxide, copper(II) oxide, copper(I) oxide, tin(IV) oxide, titanium dioxide, manganese dioxide, manganese(III) oxide, chromium(III) oxide, cobalt(II) oxide, silicon dioxide, nickel(II) oxide, silver oxide, molybdenum trioxide, lead(II,IV) oxide, bismuth(III) oxide, and combinations and mixtures thereof, and a metal of the thermite composition may, but need not, be selected from the group consisting of aluminum, magnesium, silicon, manganese, an alloy of magnesium and aluminum, and combinations and mixtures thereof. The thermite composition may, but need not, comprise more than one metal, more than one metal oxide, or both. In one configuration, the heat-generating composition 112 comprises a thermite composition that comprises a mixture of ferric oxide and aluminum. It is typical, especially when the heat-generating composition 112 is a thermite composition, to provide the heat-generating composition 112 either in the form of a powder or mixture of powders, or as a cast, bonded, or cemented sheet or other article, but it is to be appreciated that the heat-generating composition 112 can take any of a number of other suitable physical forms, including, by way of non-limiting example, pellets, sheets, tubes, rods, and fibers.

Optionally, a support element 115 may be placed in the container below the heat-generating composition 112 to hold the heat-generating composition 112 in place in the upper compartment 101; the support element 115, if provided, may be placed before placement of the heat-generating composition 112 (for example, a heat-generating composition 112 in the form of powder, pellets, etc. may be poured or otherwise placed onto the support element 115), or, as illustrated in FIG. 4E, the support element 115 may be a scaffold or substrate onto which the heat-generating composition 112 is cast, bonded, or cemented prior to being placed in the container. In some embodiments, the support element 115 may be a relatively thin and/or flexible component, and/or may be constructed of material(s) having a relatively low melting, vaporization, and/or sublimation temperature, such that the support element 115 melts, vaporizes, sublimates, or otherwise disintegrates during operation of the gas generator device 100; one example of a suitable material for a support element 115 of this type is aluminum foil. It is to be expressly understood that some embodiments of the gas generator device 100 may omit the support element 115, in which case the heat-generating composition 112 may be in direct physical contact with and/or directly supported by the first separator 104a, and in some embodiments the heat-generating composition 112 may even be cast, cemented, or bonded directly onto a top surface of the first separator 104a, either before or after placement of the first separator 104a into the container.

As further illustrated in FIG. 4E, after placement of the heat-generating composition 112 into the upper compartment 101, construction of the gas generator device may further include provision of an igniter 105 and/or a top enclosure 111d comprising an outlet 107. The igniter 105 may cause the ignition of the heat-generating composition 112; in some configurations, a spark generated within the igniter 105 may initiate the ignition process, while in other configurations, the ignition process may be initiated by thermal energy generated within the igniter 105. The thermal energy provided within igniter 105 may be from a hot wire. In other configurations, the initiating energy within igniter 105 may be from flame. In other configurations, the initiating energy within the igniter 105 may be provided by friction. The igniter 105 may further comprise an ignition aperture in the upper compartment 101, which may be configured with a safety-delay switch system.

Although not illustrated in FIGS. 4A through 4E, in some embodiments, the gas generator device 100 may further include a second, separate igniter and associated heat-generating composition interconnected with the compartment in which the neutralizing gas-generating composition is provided, e.g., the third compartment 103. This igniter and associated heat-generating composition may initiate the thermal decomposition and/or phase change in the neutralizing gas-generating composition to release the neutralizing gas. In some configurations, a spark generated within the igniter initiates the release of the neutralizing gas. In other configurations, the neutralizing gas is initiated by thermal energy generated within the igniter. The thermal energy provided within the igniter may be from a hot wire. In other configurations, the initiating energy within the igniter may be from flame. In other configurations, the initiating energy within the igniter may be provided by friction. The igniter may further comprise an ignition aperture in the compartment with which it is interconnected, e.g., the third compartment 103. The ignition aperture may be configured with a safety-delay switch system.

The product gas(es) may be released through outlet 107; in some embodiments, the outlet 107 may be interconnected with a heat exchanger 106 (not depicted in FIGS. 4A through 4E) that is configured to cool the product gas(es). Optionally, the outlet 107 (and/or heat exchanger 106, if provided) may comprise or be interconnected with one or more filters, sieves, traps, condensers, or other similar components to selectively remove an identified undesirable species from the product gas(es). In some embodiments, the filter, sieve, trap, condenser, or similar component may selectively remove residual/unreacted neutralizing gas, but it is to be expressly understood that this is not always necessary, and in some embodiments it is not undesirable, and may even be beneficial, for at least some of the neutralizing gas to be released from the gas generator 100 through outlet 107. Indeed, in some embodiments, the neutralizing gas, or a gaseous species produced by reaction of the neutralizing gas with a reactive species, may itself be a desired product gas (e.g., hydrogen gas), whether the same gas or a different gas as is produced by thermal decomposition of the product gas-generating composition.

In operation of the completed gas generator device 100 illustrated in FIG. 4E, the neutralizing gas (e.g., water vapor, halogen, etc.) produced by phase change and/or thermal decomposition of the neutralizing gas-generating composition (in this case, the second gas-generating composition 116) mixes throughout any volume in which a reactive species (e.g., elemental alkali metal, alkali metal hydrides, etc.) generated by thermal decomposition of the product gas-generating composition (in this case, the first gas-generating composition 114) may be located, such as, by way of non-limiting example, any one or more of the first, second, and third compartments 101,102,103, any other internal volume of the generator, a volume or vessel with which the gas generator device 100 is in fluid communication and that is configured to receive the product gas, and/or transfer lines and exit paths therebetween. Upon contacting the reactive species, the gaseous neutralizing species reacts with the reactive species to form a less reactive and/or less dangerous species (e.g., alkali metal hydroxide, alkali metal halide, etc.), thereby reducing or eliminating the hazards of the reactive species. In some embodiments, the less reactive and/or less dangerous species may be a liquid or solid under the pressure and temperature conditions that prevail inside the gas generator device 100, in which case the species may condense or deposit as liquid or solid particles within any one or more of the first, second, and third compartments 101,102,103, any other internal volume of the generator, a volume or vessel with which the gas generator device 100 is in fluid communication and that is configured to receive the product gas, and/or transfer lines and exit paths therebetween; it is to be expressly understood, however, that this is not necessarily true in all embodiments, and that the less reactive and/or less dangerous species may be in the gas phase without departing from the scope of the present disclosure.

Figure 5:
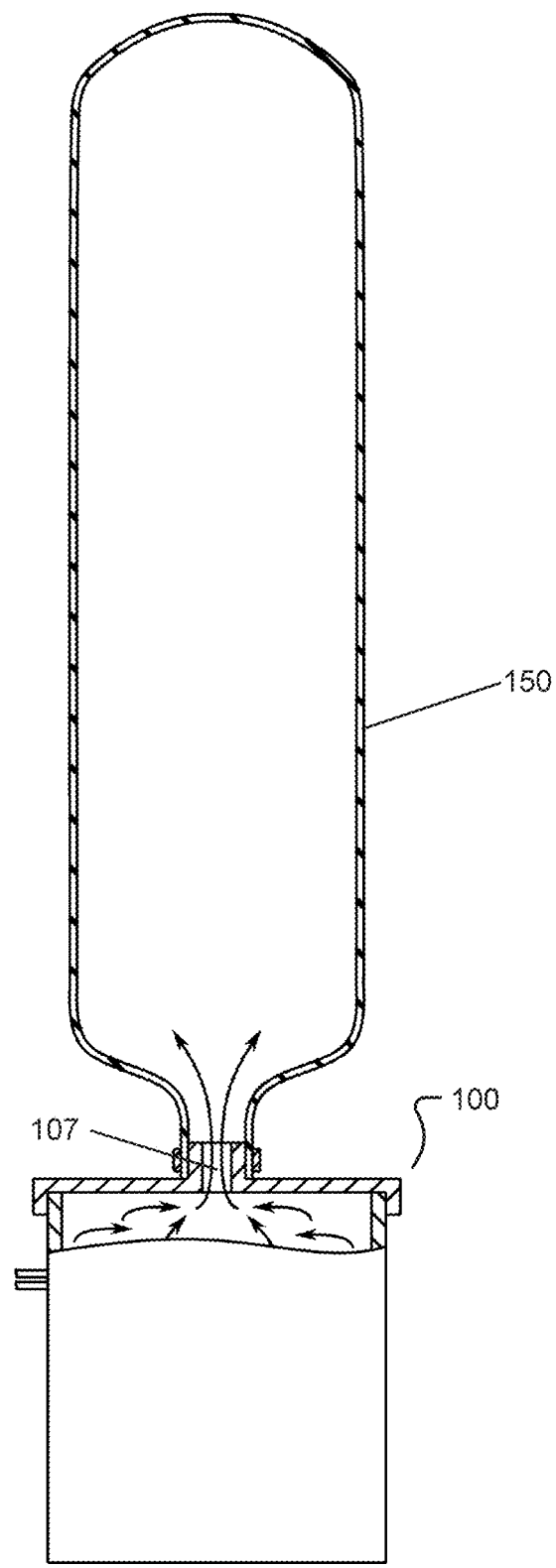
FIG. 5 illustrates an inflatable device according to some embodiments of the present disclosure.

Referring now to FIG. 5, a gas generator device 100 substantially as depicted in any one or more of FIGS. 1, 3, 4E, 6, 7, 8, and 9 is shown. In the embodiment illustrated in FIG. 5, the gas generator device 100 is in fluid communication with an inflatable article 150. As shown, operation of the gas generator device 100 causes the product gas(es) to be released through outlet 107 into the inflatable article 150, thereby inflating the inflatable article 150. In some embodiments, the inflatable article 150 may be selected from the group consisting of a balloon (e.g., a meteorological balloon), a float, or a HIAD.

Referring now to FIG. 6, another non-limiting configuration of a gas generator device 300 is illustrated. The gas generator device 300 comprises a single common compartment 301, which houses a gas generation stack 310 (which may be interchangeably referred to throughout this disclosure as a "reactive stack"), an igniter 305, and a neutralizing gas-generating composition 316 (e.g., a hydrated metal salt, a metal halide, etc.). The gas generation device 300 further comprises a filter and/or cooling assembly 306 and an outlet fitting 307.

The gas generation stack 310 consists of one or more reactive units 309 stacked atop each other, each unit 309 consisting of a heat-generating composition 312 (e.g., a thermite mixture), a separator 304, and a product gas-generating composition 314 (e.g., a metal hydride); although the gas generation stack 310 of the embodiment illustrated in FIG. 6 includes four reactive units 309, it is to be expressly understood that any alternative number of reactive units 309, such as one, two, three, four or any number more than four, may be provided within the scope of the present disclosure. The heat-generating compositions 312, separators 304, and/or gas-generating compositions 314 of the several reactive units 309 may be the same as, or different from, each other. As illustrated in FIG. 6, each reactive unit 309 may (but need not) be held together, sealed, supported, and/or separated from other reactive units 309 by a binding or wrapping 313; one example of a suitable material for a binding or wrapping 313 of this type is aluminum foil. Alternatively, the reactive units 309 may be in direct physical contact with each other (i.e., with the heat-generating composition 312 of one reactive unit lying directly below and in contact with the gas-generating composition 314 of the reactive unit 309 above), or additional separators (which may be the same as or different from separators 304) may be provided in between consecutive reactive units 309.

The igniter 305 is configured to initiate ignition/reaction of the heat-generating composition 312 of at least one reactive unit 309; in some embodiments, as illustrated in FIG. 6, the heat-generating compositions 312 of several or all of the reactive units 309 may be in direct reactive communication via a suitable propagation device 320 such that ignition of several or all of the heat-generating compositions 312 can be initiated by a single igniter 305, whereas in other embodiments there may be two or more igniters 305, each of which is configured to initiate a subset of the heat-generating compositions 312. Regardless of the exact mechanism by which the heat-generating compositions 312 are initiated, in operation, thermal energy generated by reaction of the heat-generating composition 312 of each reactive unit 309 causes at least some of the gas-generating composition 314 of the reactive unit 309 to thermally decompose and release one or more product gases (e.g., hydrogen gas) and one or more reactive species (e.g., elemental alkali metals, alkali metal hydrides, etc.) into the common compartment 301.

The neutralizing gas-generating composition 316 may be provided in any suitable physical form, such as a powder or mixture of powders, a plurality of pellets, or as a cast, bonded, or cemented sheet or other article, but in any event is provided in an outlet flow path of the product gas(es); by way of non-limiting example, as illustrated in FIG. 6, the neutralizing gas-generating composition 312 may be provided at an upper end of the common compartment 301 (supported by any suitable means, e.g., resting on a scaffold or substrate or on catches or stops provided for that purpose inside the common compartment 301, or directly on top of the reactive stack 310). This placement of the neutralizing gas-generating composition 316 may be especially advantageous in cases in which it is desired for production of the gaseous neutralizing species to begin substantially simultaneously with the beginning of production of the product gases.

In operation of the gas generator device 300, as the temperature of the neutralizing gas-generating composition 316 increases, the neutralizing gas-generating composition 316 undergoes a phase change and/or thermally decomposes to release one or more neutralizing gases (e.g., water vapor, halogens, etc.) into the common compartment 301. The heat used to evolve the gaseous neutralizing species from the neutralizing gas-generating composition 316 may be derived from any one or more sources. By way of first non-limiting example, at least a portion of this heat may be transferred to the neutralizing gas-generating composition 316 by physical contact with the hot product gas(es) generated by reaction of the product gas-generating composition 314. By way of second non-limiting example, at least a portion of this heat may be residual or waste heat from reaction of the heat-generating composition 312 and/or reaction of the product gas-generating composition 314 to form the product gas(es) (where this reaction is exothermic). By way of third non-limiting example, at least a portion of this heat may be provided by the same ignition or initiation source, i.e., the igniter(s) 305, used to initiate reaction of the heat-generating composition(s) 312. By way of fourth non-limiting example, at least a portion of this heat may be provided by a separate, dedicated portion of heat-generating composition or a separate heating element separate from the heat-generating composition(s) 312. Of course, some embodiments will feature a combination of two, three, or all four of these configurations, as well as others that will be appreciated by those of ordinary skill in the art in view of this disclosure. Upon contacting the reactive species, at least a portion of the neutralizing gas reacts with at least a portion of the reactive species to form a less reactive and/or less dangerous species, thereby reducing or eliminating the hazards of the reactive species (e.g., by mitigating the risk of ignition or explosion of the reactive species when the system including the gas generator device 300 is opened and is exposed to air) without further intervention by an operator or user of the gas generator device 300.

The filter and/or cooling assembly 306 may comprise one or more filters, sieves, traps, condensers, or other similar components, and may be configured to cool the product gas(es) and/or selectively remove an identified undesirable species from the product gas(es); the product gases are then released from the device via outlet fitting 307. In some embodiments, the filter and/or cooling assembly may selectively remove the reactive species. Additionally or alternatively, the filter and/or cooling assembly 306 may selectively remove residual/unreacted neutralizing gas, but it is to be expressly understood that this is not always necessary, and in some embodiments it is not undesirable, and may even be beneficial, for at least some of the neutralizing gas to be released from the gas generator 300 through outlet fitting 307. Indeed, in some embodiments, the neutralizing gas, or a gaseous species produced by reaction of the neutralizing gas with a reactive species, may itself be a desired product gas (e.g., hydrogen gas), whether the same gas or a different gas as is produced by thermal decomposition of the product gas-generating composition 314.

Referring now to FIG. 7, another non-limiting configuration of a gas generator device 300 is illustrated. The embodiment illustrated in FIG. 7 is similar to that illustrated in FIG. 6, except that the neutralizing gas-generating composition 316 is provided as a "jacket" that is disposed in an annular space within the common compartment 301, at least partially surrounding a circumference of the reactive stack 310. This type of embodiment may be especially advantageous in cases in which it is desired for initial production of the gaseous neutralizing species to be slightly delayed relative to the beginning of production of the product gases.

Referring now to FIG. 8, another non-limiting configuration of a gas generator device 300 is illustrated. The embodiment illustrated in FIG. 8 is similar to those illustrated in FIGS. 6 and 7, except that the neutralizing gas-generating composition 316 is provided as a neutralizing "disk" below or at a base of the reactive stack 310, such that the neutralizing gas is released into a lower portion of the common compartment 301 and mixes with the reactive species by flowing upward through the common compartment 301. In some embodiments, as illustrated in FIG. 8, the neutralizing gas-generating composition 316 may be provided as part of its own reactive unit 330, i.e., together with a dedicated heat-generating composition 312 and separator 304, while in other embodiments the neutralizing gas-generating composition 316 may be provided alone. This type of embodiment may be especially advantageous in cases in which it is desired for production of the gaseous neutralizing species to be delayed until reaction of the product gas-generating composition has slowed or substantially completed, e.g., where the gaseous neutralizing species is intended for post-reaction "cleanup" of remaining reactive species inside the gas generator device.

Figure 9:
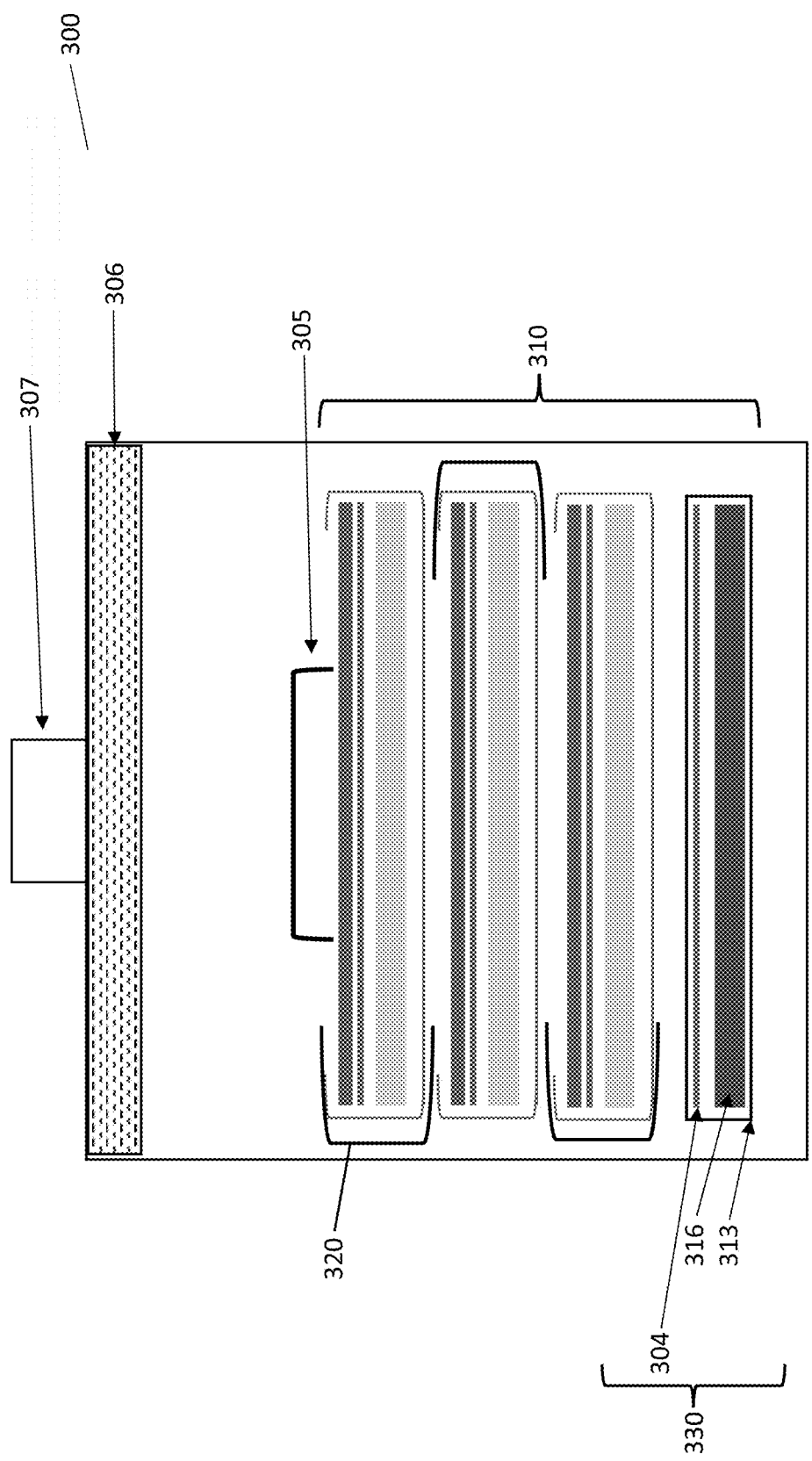
FIG. 9 illustrates a gas generator device comprising a reactive stack and a separate layer of a neutralizing gas-generating composition disposed below the reactive stack according to some embodiments of the present disclosure.

Referring now to FIG. 9, another non-limiting configuration of a gas generator device 300 is illustrated. This arrangement is similar to that of FIG. 8, with two exceptions. First, the heat-generating layer 312 is omitted in the reactive unit 330 in which the neutralizing gas-generating composition 316 is contained. Second, the binding or wrapping 313 takes the form of a fully sealed packet, within which the neutralizing gas-generating material (e.g., iodine or water) is fully sealed and which can be caused to open in operation of the gas generator device 300. In the embodiment illustrated in FIG. 9, this packet 313 takes the form of a sealed bag made of a polymeric material. Residual heat from reaction of the heat-generating compositions 312 in the reactive stack 310 can melt or otherwise degrade this bag 313 such that it opens and releases the neutralizing gas into the common compartment 301. The vapor pressure of the neutralizing gas-generating composition 316 is sufficient on its own to allow the neutralizing gas to diffuse throughout the gas generator device 300 and any associated components. The vapor pressure may, in some embodiments, be raised by residual heat from the heat-generating compositions 312, but it is to be expressly understood that this is not necessary in all embodiments.

FIG. 10 depicts a process 400 for using a gas generator device, such as the gas generator device 300 of FIG. 9.

In step 410, reaction of a heat-generating composition is initiated. The reaction releases thermal energy. The heat-generating composition may be a thermite composition comprised of a metal and a metal oxide. The metal oxide may, but need not, be selected from the group consisting of vanadium(V) oxide, iron(III) oxide, iron(II,III) oxide, copper(II) oxide, copper(I) oxide, tin(IV) oxide, titanium dioxide, manganese dioxide, manganese(III) oxide, chromium (III) oxide, cobalt(II) oxide, silicon dioxide, nickel(II) oxide, silver oxide, molybdenum trioxide, lead(II,IV) oxide, bismuth(III) oxide, and combinations thereof, and the metal may, but need not, be selected from the group consisting of aluminum, magnesium, silicon, manganese, an alloy of magnesium and aluminum, and combinations thereof. The thermite composition may, but need not, comprise more than one metal, more than one metal oxide, or both.

Step 410 may further include contacting the heat-generating composition with an igniter to initiate the reaction. In some configurations the reaction may be initiated by contacting the igniter with one of a hot wire or a spark. In other configurations, flame may initiate the reaction of the heat-generating composition via the igniter. In yet other configurations, friction may initiate reaction of the heat-generating composition via the igniter.

In step 420, at least a portion of the thermal energy released by the reaction of the heat-generating composition is transferred to a product gas-generating composition, which may be, e.g., a metal hydride. Non-limiting examples of metal hydrides suitable for use include lithium aluminum hydride (LiAlH$_4$), sodium aluminum hydride (NaAlH$_4$), potassium aluminum hydride (KAlH$_4$), lithium borohydride (LiBH$_4$), sodium borohydride (NaBH$_4$), potassium borohydride (KBH$_4$), lithium hydride (LiH), sodium hydride (NaH), potassium hydride (KH), magnesium hydride (MgH$_2$), calcium hydride (CaH$_2$), and combinations and mixtures thereof.

In step 430, the thermal energy transferred to the product gas-generating composition begins to decompose the product gas-generating composition to release a product gas or mixture of gases (e.g., hydrogen gas) and one or more reactive species (e.g., alkali metals in elemental form, alkali metal hydrides, etc.).

In step 440, a neutralizing gas and/or neutralizing gas-generating composition is released from a reservoir contained within a sealed container, e.g., a compartment, sealed bag, sealed packet, etc., which in turn is located within an interior volume of the gas generator device. The opening or unsealing of the compartment, bag, packet, etc. may be accomplished by any suitable means; in some embodiments, by way of non-limiting example, a material of the bag or packet may, due to increasing temperature within the interior of the gas generator device, fail, melt, rupture, or tear, thereby releasing the neutralizing gas and/or neutralizing gas-generating composition into the surrounding volume.

In step 450, the vapor pressure of the neutralizing gas causes the neutralizing gas to diffuse throughout an internal volume of the generator, a volume or vessel with which the generator is in fluid communication and that is configured to receive the product gas, and/or transfer lines and exit paths therebetween. In some embodiments, step 450 may comprise a first sub-step of causing phase change (e.g., sublimation, vaporization) and/or thermal decomposition of a neutralizing gas-generating composition to release a neutralizing gas, and a second sub-step of causing the neutralizing gas to diffuse throughout the volume.

It is to be expressly understood that in some embodiments, steps 440 and 450 may be carried out before or simultaneously with steps 420 and 430. In other words, it is not necessary that thermal decomposition of the product gas-generating composition to release the product gas begin before diffusion of the neutralizing gas throughout the device (and/or associated lines, inflatable device, etc.).

In step 460, the neutralizing gas (e.g., water vapor, halogen, etc.) contacts and reacts with the reactive species to form a less reactive and/or less dangerous species (e.g., alkali metal hydroxide, alkali metal halide, etc.), thereby reducing or eliminating the hazards of the reactive species. It is to be expressly understood that step 460 may, and in many embodiments does, begin while any one or more of steps 420 through 450 is continuing.

In optional step 470, one or both of the product gas and any excess/residual neutralizing gas may be cooled, in some embodiments by a heat exchanger.

In optional step 480, the product gas may be used for one of: inflation of a meteorological balloon; inflation of other types of balloons; inflation of a blimp; inflation of a hypersonic inflatable aerodynamic decelerator (HIAD); inflation of an inflatable article; pressurization of a gas storage cylinder; and the like.

It is to be expressly understood that in embodiments of the method that include steps 470 and/or 480, these steps are not necessarily strictly sequential with steps 430 through 460. Rather, at least a portion of one or more product and/or neutralizing gases may begin to cool (as in step 470) and/or exit the generator device and begin to inflate an inflatable device or pressurize a cylinder (as in step 480) as soon as these gases begin to be evolved or released in step 430 and/or step 440. Thus, the cooling step 470 and inflation/pressurization step 480 may begin while the production and/or release of the product and/or neutralizing gases in steps 430 and 440 is continuing/ongoing.

Embodiments of the devices and methods disclosed herein may be directed to the thermal decomposition of any one or more metal hydrides, such as but not limited to lithium aluminum hydride (LiAlH$_4$), sodium aluminum hydride (NaAlH$_4$), potassium aluminum hydride (KAlH$_4$), lithium borohydride (LiBH$_4$), sodium borohydride (NaBH$_4$), potassium borohydride (KBH$_4$), lithium hydride (LiH), sodium hydride (NaH), potassium hydride (KH), magnesium hydride (MgH$_2$), calcium hydride (CaH$_2$), and combinations and mixtures thereof.

Embodiments of the devices and methods disclosed herein may be directed to the production of any one or more product gases, but particularly may be directed to the production of hydrogen gas, either directly or by secondary decomposition of another gas. Hydrogen gas may, in embodiments, generally make up at least about 75 mol %, more generally at least about 70 mol %, even more generally at least about 65 mol %, yet even more generally at least about 60 mol %, still yet even more generally at least about 55 mol %, still yet even more generally at least about 50 mol %, still yet even more generally at least about 45 mol %, still yet even more generally at least about 40 mol %, still yet even more generally at least about 35 mol %, still yet even more generally at least about 30 mol %, or still yet even more generally at least about 25 mol % of the total product gas content.

In embodiments of the devices and methods disclosed herein, the composition of the product gas(es) may be such that it is not necessary to provide additional heat or other (or, in some cases, any) energy inputs to maintain most or all of the product gas(es) in the desired gaseous state after formation of the gas. By way of non-limiting example, the product gas(es) may in some embodiments be passively or actively cooled to ambient or near-ambient temperatures (e.g., at least substantially, if not entirely, free of added heat or thermal energy relative to ambient conditions), without risk of undesirable condensation of product gas(es). In this way, the devices and methods disclosed herein may advantageously serve differing purposes relative to gas generation devices and methods of the prior art.

In some embodiments, the precise chemical composition or properties of the one or more product gas(es) are not a consideration, or at least are not as crucial a consideration, as the rate or amounts (whether molar or mass amounts) in which the product gas(es) can be generated; by way of non-limiting example, it may be desirable to produce as great a molar quantity of gas as possible to inflate an inflatable article to the greatest extent possible, since volume is directly related not to mass of the gas but to its molar quantity. In these applications, it may be desirable to cause the metal hydride to decompose in the first instance, and/or to cause one or more product gas(es) to undergo secondary decomposition, into as "small" (in molecular weight terms) a gas as possible to increase the volume of gas produced without requiring additional mass of materials. One such desirable "small" gas is hydrogen gas (H$_2$). Thus, in embodiments, a heat-generating composition may be provided that provides temperatures great enough to rapidly facilitate decomposition of, a "large" gas to a "smaller" gas, such as hydrogen gas. In other embodiments, a catalyst may be provided in the compartment containing the metal hydride that catalyzes the decomposition of a product gas into hydrogen gas or another "small" gas.

In some embodiments, it may be necessary to minimize or eliminate byproducts, impurities, and other undesirable species in the product gas(es). However, limitations on the availability of a suitable metal hydride may necessitate the use of a metal hydride that is susceptible to the production of such byproducts, impurities, and undesirable species. Thus, devices and systems of the present disclosure may include one or more filters, sieves, traps, condensers, or other similar components to selectively remove an identified undesirable species from the product gas(es). Such components can be provided in association with the compartment in which the product gas(es) is/are formed by decomposition of the metal hydride, or they can be provided in association with a separate compartment into which the one or more product gases flow after formation.

In some embodiments, it may be desirable to provide for further chemical processing of the one or more product gases. Particularly, it may be desirable to provide for subsequent chemical reaction of one or more product gases, e.g., gas production or gas reformation. In such embodiments, the devices and methods of the invention may employ a catalyst configured to facilitate such chemical processing of the one or more product gases. Such catalyst may be provided in any desired spatial arrangement (e.g., a fixed bed), and may be present either in one or more of the compartments in which the one or more product gases are formed (i.e., the compartment(s) containing the metal hydride), or in a separate compartment configured to receive the one or more product gases.

In embodiments of the present disclosure, one or more of the gas-generating compositions, e.g., a metal hydride, may be selected based on the identity of the gas or gases desired to be produced. In some embodiments, the desired gas may be a secondary decomposition product, i.e., a gas that is produced by first thermally decomposing the gas-generating composition into an intermediate species and then further thermally or catalytically decomposing the intermediate species to the desired gas, and the gas-generating composition may be selected accordingly.

In embodiments of the present disclosure in which one or more of the gas-generating compositions is a polymer, the polymer may be provided in any suitable physical form. By way of first non-limiting example, the polymer may be provided in a physical form comprising one or more pellets. By way of second non-limiting example, the polymer may be provided in a physical form comprising one or more sheets. By way of third non-limiting example, the polymer may be provided in a physical form comprising one or more tubes. By way of fourth non-limiting example, the polymer may be provided in a physical form comprising one or more rods. By way of fifth non-limiting example, the polymer may be provided in a physical form comprising one or more fibers. By way of sixth non-limiting example, the polymer may be provided in a physical form comprising one or more molded shapes or articles.

While the foregoing disclosure has in some cases focused on the production of gases in the context of inflating an inflatable article, it is to be expressly understood that the devices and methods of the disclosure are suitable to produce one or more product gases for any desired application. By way of first non-limiting example, the devices and methods of the disclosure may be used to fill or pressurize a cylinder, tank, or vessel, e.g., a storage cylinder or tank, with a desired gas. By way of second non-limiting example, the devices and methods of the disclosure may be used to produce a lifting gas to be used in, e.g., a buoyant vehicle or article such as a balloon or a float. These and other applications are within the scope of the present disclosure.

The concepts illustratively disclosed herein suitably may be practiced in the absence of any element which is not specifically disclosed herein. It is apparent to those skilled in the art, however, that many changes, variations, modifications, other uses, and applications of the disclosure are possible, and changes, variations, modifications, other uses, and applications which do not depart from the spirit and scope of the disclosure are deemed to be covered by the disclosure.

The foregoing discussion has been presented for purposes of illustration and description. The foregoing is not intended to limit the disclosure to the form or forms disclosed herein. In the foregoing Detailed Description, for example, various features are grouped together in one or more embodiments for the purpose of streamlining the disclosure. The features of the embodiments may be combined in alternate embodiments other than those discussed above. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment.

Moreover, though the present disclosure has included description of one or more embodiments and certain variations and modifications, other variations, combinations, and modifications are within the scope of the disclosure, e.g., as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, regardless of whether such alternate, interchangeable, and/or equivalent structures, functions, ranges, or steps are disclosed herein, and without intending to publicly dedicate any patentable subject matter.

The invention claimed is:

1. A gas generator device, comprising:
   a heat-generating composition, configured to undergo a reaction that releases heat when ignited;
   a product gas-generating composition, configured to thermally decompose to release a product gas and a reactive species upon receiving at least a portion of the heat released by reaction of the heat-generating composition; and
   a neutralizing gas-generating composition,
   wherein the gas generator device is configured to heat the neutralizing gas-generating composition and thereby cause the neutralizing gas-generating composition to undergo a phase change or thermal decomposition to release a neutralizing gas, and
   wherein the gas generator device is further configured to cause at least a portion of the reactive species and at least a portion of the neutralizing gas to contact and chemically react with each other to form a less reactive species.

2. The gas generator device of claim 1, further comprising:
   a first compartment, containing the heat-generating composition;

a second compartment, containing the product gas-generating composition; and a first separator, positioned between and separating the first and second compartments, wherein the gas generator device is configured such that, when the reaction of the heat-generating composition is initiated by ignition of the heat-generating composition, at least a portion of the heat released by the reaction is transferred from the first compartment to the second compartment via the first separator at a first heat transfer rate.

3. The gas generator device of claim 2, further comprising:

a third compartment, containing the neutralizing gas-generating composition; and a second separator, positioned between and separating the second and third compartments, wherein the gas generator device is further configured such that at least a portion of the heat transferred from the first compartment to the second compartment via the first separator is subsequently transferred from the second compartment to the third compartment via the second separator at a second heat transfer rate.

4. The gas generator device of claim 1, wherein at least a portion of the neutralizing gas-generating composition is disposed within an outlet path of the product gas.

5. The gas generator device of claim 1, wherein the heat-generating composition and the product gas-generating composition are provided in a reactive stack, wherein the reactive stack is disposed within an interior volume of the gas generator device, and wherein at least a portion of the neutralizing gas-generating composition is disposed within the interior volume.

6. The gas generator device of claim 5, wherein the neutralizing gas-generating composition at least partially circumferentially surrounds the reactive stack within the interior volume.

7. The gas generator device of claim 5, wherein the neutralizing gas-generating composition is provided at a base of or below the reactive stack.

8. The gas generator device of claim 1, wherein the heat-generating composition comprises a thermite composition, the thermite composition comprising a mixture of a metal fuel and a metal oxide oxidizer that undergoes an exothermic reduction-oxidation reaction when ignited by heat.

9. The gas generator device of claim 1, wherein the product gas-generating composition comprises a metal hydride.

10. The gas generator device of claim 1, wherein the product gas is hydrogen gas.

11. The gas generator device of claim 1, wherein the reactive species comprises at least one of an alkali metal in elemental form and an alkali metal hydride.

12. The gas generator device of claim 1, wherein the neutralizing gas-generating composition comprises at least one of a hydrated metal salt, a halogen in elemental form, a metal halide, an ammonium salt, a compound containing an ammonia-bearing complex ion, or an alcohol.

13. The gas generator device of claim 1, wherein the neutralizing gas comprises at least one of water vapor and a halogen.

14. The gas generator device of claim 1, configured to heat the neutralizing gas-generating composition by at least one of (i) physical contact with the product gas, (ii) residual or waste heat from reaction of the heat-generating composition, (iii) residual or waste heat from thermal decomposition of the product gas-generating composition, wherein the thermal decomposition of the product gas-generating composition is exothermic, and (iv) a separate portion of heat-generating composition.

15. The gas generator device of claim 1, further comprising an igniter configured to ignite the heat-generating composition.

16. A method, comprising:

(a) initiating a reaction of a heat-generating composition to release thermal energy;

(b) thermally decomposing, by at least a portion of the thermal energy released in step (a), at least a portion of a product gas-generating composition to release a product gas and a reactive species;

(c) heating a neutralizing gas-generating composition to release a neutralizing gas; and (d) contacting at least a portion of the reactive species with at least a portion of the neutralizing gas to cause a chemical reaction that forms a less reactive species.

17. The method of claim 16, wherein at least a portion of the neutralizing gas-generating composition is disposed within an outlet path of the product gas.

18. The method of claim 16, wherein the heat-generating composition and the product gas-generating composition are provided in a reactive stack, wherein the reactive stack is disposed within an enclosed volume, and wherein at least a portion of the neutralizing gas-generating composition is disposed within the enclosed volume.

19. The method of claim 18, wherein the neutralizing gas-generating composition at least partially circumferentially surrounds the reactive stack within the enclosed volume.

20. The method of claim 18, wherein the neutralizing gas-generating composition is provided at a base of or below the reactive stack.

21. The method of claim 16, wherein the heat-generating composition comprises a thermite composition, the thermite composition comprising a mixture of a metal fuel and a metal oxide oxidizer that undergoes an exothermic reduction-oxidation reaction when ignited by heat.

22. The method of claim 16, wherein the product gas-generating composition comprises a metal hydride.

23. The method of claim 16, wherein the product gas is hydrogen gas.

24. The method of claim 16, wherein the reactive species comprises at least one of an alkali metal in elemental form and an alkali metal hydride.

25. The method of claim 16, wherein the neutralizing gas-generating composition comprises at least one of a hydrated metal salt, a halogen in elemental form, a metal halide, an ammonium salt, or a compound containing an ammonia-bearing complex ion, or an alcohol.

26. The method of claim 16, wherein the neutralizing gas comprises at least one of water vapor and a halogen.

27. The method of claim 16, wherein step (c) is carried out by at least one of (i) physical contact with the product gas, (ii) residual or waste heat from reaction of the heat-generating composition, (iii) residual or waste heat from thermal decomposition of the product gas-generating composition, wherein the thermal decomposition of the product gas-generating composition is exothermic, and (iv) a separate portion of heat-generating composition.

28. An inflatable device, comprising:

an inflatable article; and the gas generator device of claim 1, interconnected to and configured to inflate the inflatable article with the product gas.

29. A gas generator device, comprising:
- a heat-generating composition, configured to undergo a reaction that releases heat when ignited;
- a product gas-generating composition, configured to thermally decompose to release a product gas and a reactive species upon receiving at least a portion of the heat released by reaction of the heat-generating composition; and
- a neutralizing gas-generating composition contained in a sealed environment,
- wherein the gas generator device is configured to cause the sealed environment to open to cause the release of a neutralizing gas, and
- wherein the gas generator device is further configured to cause at least a portion of the reactive species and at least a portion of the neutralizing gas to contact and chemically react with each other to form a less reactive species.

30. The gas generator device of claim 29, further comprising:
- a first compartment, containing the heat-generating composition;
- a second compartment, containing the product gas-generating composition; and
- a first separator, positioned between and separating the first and second compartments,
- wherein the gas generator device is configured such that, when the reaction of the heat-generating composition is initiated by ignition of the heat-generating composition, at least a portion of the heat released by the reaction is transferred from the first compartment to the second compartment via the first separator at a first heat transfer rate.

31. The gas generator device of claim 29, wherein the sealed environment comprises a sealed packet surrounding the neutralizing gas-generating composition and the opening of the sealed environment comprises melting or thermal degradation of a material of the sealed packet.

32. The gas generator device of claim 29, wherein the heat-generating composition comprises a thermite composition, the thermite composition comprising a mixture of a metal fuel and a metal oxide oxidizer that undergoes an exothermic reduction-oxidation reaction when ignited by heat.

33. The gas generator device of claim 29, wherein the product gas-generating composition comprises a metal hydride.

34. The gas generator device of claim 29, wherein the product gas is hydrogen gas.

35. The gas generator device of claim 29, wherein the reactive species comprises at least one of an alkali metal in elemental form and an alkali metal hydride.

36. The gas generator device of claim 29, wherein the neutralizing gas comprises at least one of water vapor and a halogen.

37. The gas generator device of claim 29, further comprising an igniter configured to ignite the heat-generating composition.

38. A method, comprising:
- (a) initiating a reaction of a heat-generating composition to release thermal energy;
- (b) thermally decomposing, by at least a portion of the thermal energy released in step (a), at least a portion of a product gas-generating composition to release a product gas and a reactive species;
- (c) causing a sealed reservoir containing a neutralizing gas to open to release the neutralizing gas; and
- (d) contacting at least a portion of the reactive species with at least a portion of the neutralizing gas to cause a chemical reaction that forms a less reactive species.

39. The method of claim 38, wherein the heat-generating composition and the product gas-generating composition are provided in a reactive stack, wherein the reactive stack is disposed within an enclosed volume, and wherein at least a portion of the sealed reservoir is disposed within the enclosed volume.

40. The method of claim 39, wherein the sealed reservoir at least partially circumferentially surrounds the reactive stack within the enclosed volume.

41. The method of claim 39, wherein the sealed reservoir is provided at a base of or below the reactive stack.

42. The method of claim 38, wherein the heat-generating composition comprises a thermite composition, the thermite composition comprising a mixture of a metal fuel and a metal oxide oxidizer that undergoes an exothermic reduction-oxidation reaction when ignited by heat.

43. The method of claim 38, wherein the product gas-generating composition comprises a metal hydride.

44. The method of claim 38, wherein the product gas is hydrogen gas.

45. The method of claim 38, wherein the reactive species comprises at least one of an alkali metal in elemental form and an alkali metal hydride.

46. The method of claim 38, wherein the neutralizing gas comprises at least one of iodine, bromine, an alcohol, and water.

47. An inflatable device, comprising:
- an inflatable article; and
- the gas generator device of claim 29, interconnected to and configured to inflate the inflatable article with the product gas.

* * * * *